US009164957B2

(12) United States Patent
Hassib et al.

(10) Patent No.: US 9,164,957 B2
(45) **Date of Patent: *Oct. 20, 2015**

(54) SYSTEMS AND METHODS FOR TELEMATICS MONITORING AND COMMUNICATIONS

(71) Applicant: LexisNexis Risk Solutions Inc., Alpharetta, GA (US)

(72) Inventors: Ash Hassib, Acworth, GA (US); Charles Kaminski, Alpharetta, GA (US); Aaron G Pierce, Roswell, GA (US)

(73) Assignee: LEXISNEXIS RISK SOLUTIONS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,717

(22) Filed: Mar. 12, 2013

(65) Prior Publication Data

US 2013/0190967 A1 Jul. 25, 2013

Related U.S. Application Data

(63) Continuation-in-part of application No. 13/012,400, filed on Jan. 24, 2011, now abandoned, and a continuation-in-part of application No. 13/350,388, filed on Jan. 13, 2012.

(60) Provisional application No. 61/738,436, filed on Dec. 18, 2012.

(51) Int. Cl.

*G08G 1/01* (2006.01)
*G06F 17/00* (2006.01)

(Continued)

(52) U.S. Cl.

CPC ................ *G06F 17/00* (2013.01); *G06Q 10/00* (2013.01); *G06Q 50/30* (2013.01); *G07C 5/008* (2013.01)

(58) Field of Classification Search

USPC ................ 705/31.5; 340/439, 540, 933, 936; 701/1, 36

See application file for complete search history.

(56) References Cited

U.S. PATENT DOCUMENTS 5,797,134 A 8/1998 McMillan et al.
6,064,970 A 5/2000 McMillan et al.

(Continued)

FOREIGN PATENT DOCUMENTS

EP 1921580 5/2008
WO 2011057217 5/2011

OTHER PUBLICATIONS

International Search Report and Written Opinion dated Apr. 9, 2012 for related PCT Patent Application No. PCT/US2012/022413.

(Continued)

*Primary Examiner* — Olabode Akintola

(74) *Attorney, Agent, or Firm* — Troutman Sanders LLP; James E. Schutz; Mark Lehi Jones

(57) ABSTRACT

Certain example embodiments of the disclosed technology may include systems and methods for telematics monitoring. An example method is provided that includes receiving, at a mobile computing device, and from a Vehicle Identification Unit (VIU), identification (ID) data representing a first vehicle. The method further includes receiving, by the mobile computing device, sensor data from one or more sensors associated with the mobile computing device. Certain embodiments may further include receiving, at an Operational Measurement Unit (OMU), an operation indication associated with the first vehicle. The OMU may include an operational measurement component configured to advance an operational count in response to receiving the operation indication. Certain example embodiments may include transmitting telematics data by the mobile computing device. In certain embodiments, the telematics data may include least a portion of one or more of the ID data, the sensor data, and/or the operational count data.

24 Claims, 9 Drawing Sheets

124
122
126
128
130
116
Telematic Data
Mobile Device Sensor Data
114
Vehicle ID Data
113
120
118
115
Operational measurement data
Vehicular Data
112
111
102
106
108
104
107
103
105
110

(51) Int. Cl.

| | |
|---|---|
| ***G06Q 10/00*** | (2012.01) |
| ***G06Q 50/30*** | (2012.01) |
| ***G07C 5/00*** | (2006.01) |

(56) References Cited

U.S. PATENT DOCUMENTS

| | | | |
|---|---|---|---|
| 6,714,894 | B1 | 3/2004 | Tobey et al. |
| 6,868,386 | B1 | 3/2005 | Henderson et al. |
| 7,010,289 | B2 | 3/2006 | Jijina et al. |
| 7,124,088 | B2 | 10/2006 | Bauer et al. |
| 7,346,374 | B2 | 3/2008 | Witkowski et al. |
| 7,778,752 | B1 | 8/2010 | Hunt et al. |
| 7,792,328 | B2 | 9/2010 | Albertson et al. |
| 7,868,753 | B2 | 1/2011 | Jenkins et al. |
| 7,890,653 | B2 | 2/2011 | Kutsumi et al. |
| 7,937,278 | B1 | 5/2011 | Cripe et al. |
| 8,044,809 | B2 | 10/2011 | Farmer |
| 8,090,598 | B2 | 1/2012 | Bauer et al. |
| 8,140,350 | B2 | 3/2012 | Rothpearl et al. |
| 8,280,752 | B1 | 10/2012 | Cripe et al. |
| 8,311,858 | B2 * | 11/2012 | Everett et al. ..................... 705/4 |
| 2002/0095249 | A1 * | 7/2002 | Lang ............................... 701/29 |
| 2003/0114206 | A1 | 6/2003 | Timothy et al. |
| 2004/0203379 | A1 | 10/2004 | Witkowski et al. |
| 2008/0076447 | A1 | 3/2008 | Duxbury et al. |
| 2008/0150761 | A1 * | 6/2008 | Hines et al. ................... 340/936 |
| 2008/0255888 | A1 | 10/2008 | Berkobin et al. |
| 2008/0294302 | A1 | 11/2008 | Basir |
| 2008/0319665 | A1 | 12/2008 | Berkobin et al. |
| 2009/0063174 | A1 | 3/2009 | Fricke |
| 2010/0030586 | A1 | 2/2010 | Taylor et al. |
| 2010/0045452 | A1 | 2/2010 | Periwal |
| 2010/0082245 | A1 | 4/2010 | Patenaude et al. |
| 2010/0131305 | A1 | 5/2010 | Collopy et al. |
| 2010/0145865 | A1 | 6/2010 | Berger et al. |
| 2010/0231383 | A1 * | 9/2010 | Levine et al. ................. 340/540 |
| 2010/0238009 | A1 * | 9/2010 | Cook et al. .................... 340/439 |
| 2010/0332266 | A1 | 12/2010 | Tamir et al. |
| 2011/0012720 | A1 | 1/2011 | Hirschfeld |
| 2011/0040579 | A1 | 2/2011 | Havens |
| 2011/0077028 | A1 | 3/2011 | Wilkes, III et al. |
| 2011/0161116 | A1 * | 6/2011 | Peak et al. ........................ 705/4 |
| 2011/0161119 | A1 | 6/2011 | Collins |
| 2011/0258044 | A1 | 10/2011 | Kargupta |
| 2012/0158436 | A1 | 6/2012 | Bauer et al. |
| 2014/0067152 | A1 * | 3/2014 | Swanson et al. .................. 701/1 |

OTHER PUBLICATIONS

International Search Report and Written Opinion dated Mar. 22, 2013 for related PCT Patent Application No. PCT/US2013/024123.

Sprint M2M Brochure, "Increase Safety and Profits," Retrieved online at http://m2m.sprint.com/media/43189/115518-usage-based-insurance-fs-1d.pd., pp. 1 and 2, Accessed May 3, 2012.

Di Lecce, Vincenzo et al., "Experimental System to Support Real-Time Driving Pattern Recognition," Springer-Verlag Berlin Heidelberg, pp. 1192-1199, 2008.

Dai, Jiangpeng et al., "Mobile Phone based Drunk Driving Detection," Pervasive Computing Technologies for Healthcare (PervasiveHealth), 2010 4th International Conference on—No Permissions, pp. 1-8.

Gazali, El H., "Monitoring Erratic Driving Behaviour caused by Vehicle Overtaking using of-the-shelf Technologies," Disseration submitted to the University of Dublin, Oct. 2010, pp. -71.

International Search Report and Written Opinion dated Apr. 16, 2014, issued by the United States Patent and Trademark Office for related PCT Application No. PCT/US2014/24394.

International Preliminary Report on Patentability dated Jul. 24, 2014for related PCT Application No. PCT/US2013/021423.

* cited by examiner

SYSTEMS AND METHODS FOR TELEMATICS MONITORING AND COMMUNICATIONS

RELATED APPLICATIONS

This application is a continuation-in-part of U.S. patent application Ser. No. 13/012,400, filed on Jan. 24, 2011, and entitled "TELEMATICS SMART PINGING SYSTEMS AND METHODS," the contents of which are hereby incorporated by reference in their entirety.

This application is also continuation-in-part of U.S. patent application Ser. No. 13/350,388, filed on Jan. 13, 2012, and entitled "TELEMATICS SMART PINGING SYSTEMS AND METHODS," the contents of which are hereby incorporated by reference in their entirety.

This application is also related to PCT application no. PCT/US2012/022413, filed on Jan. 24, 2012, and entitled "TELEMATICS SMART PINGING SYSTEMS AND METHODS," the contents of which are hereby incorporated by reference in their entirety.

This application is also related to PCT application no. PCT/US2013/021423, filed on Jan. 14, 2013, and entitled "TELEMATICS SMART PINGING SYSTEMS AND METHODS," the contents of which are hereby incorporated by reference in their entirety.

This application also related to U.S. Provisional Patent application Ser. No. 61/738,436, filed on 18 Dec. 2012, entitled: "SYSTEMS AND METHODS FOR TELEMATICS MONITORING AND COMMUNICATIONS," the contents of which are hereby incorporated by reference in their entirety.

TECHNICAL FIELD

Various embodiments of the disclosed technology relate to telematics monitoring and communication systems and methods, and more particularly, to cost-effective telematics systems and methods for monitoring vehicular and operator data.

BACKGROUND

One of the challenges faced by many businesses involves determining accurate risk factors associated with individuals. For example, insurance providers may set rates for applicants based on their known or assumed risk factors. A conventional method for determining risk utilizes general personal information such as age, sex, marital status, driving record, etc. The general personal information, along with actuarial, statistical, or empirical data associated with the general population is then utilized to help categorize individuals and set appropriate insurance rates. However, the individual may exhibit certain behaviors and habits, or may intermittently engage in high-risk activities that are not reflected in the general personal information, and the actual risk factors may differ widely from person-to-person within a given actuarial category.

In certain situations, it may be desirable to know the actual identity of a person involved in a specific incident. However, the general personal information is often insufficient for determining the habits, behaviors, or the actual identity of an individual. Conventional methods used by insurance providers to determine costs of motor vehicle insurance involve gathering relevant personal data from the applicant and referencing the applicant's public motor vehicle driving records and historical accident data. Such data generally results in a classification of the applicant to a broad actuarial class for which insurance rates are assigned based upon empirical experiences of an insurance provider. Various factors can be relevant to classification in a particular actuarial class, such as age, sex, marital status, home location, and driving record. Based on the personal data received from and about the applicant, the insurance provider can assign the applicant to an actuarial class and then assign an insurance premium based on that actuarial class.

Because a selected insurance premium is dependent on the applicant's personal data, a change to that personal data can result in a different premium being charged if the change results in a different actuarial class for the applicant. For instance, if a first actuarial class includes drivers between the ages of 36 and 40, and a second actuarial class includes drivers between the ages of 41 and 45, then a change in the applicant's age from 38 to 39 may not result in a different actuarial class, but a gradual change from 38 to 45 may result in a changed actuarial class and thus a changed insurance premium.

A principal issue associated with these conventional insurance determination systems is that the personal data collected from the applicant is generally not verifiable. For instance, the insurance provider may have no means to verify the applicant's mileage per year or the applicant's driving styles, either of which can be relevant to the selected insurance premium. Accordingly, the insurance provider's categorization of the applicant into a certain actuarial class may be based on false or incomplete information about the applicant, which can in turn result in an insurance premium that does not accurately reflect the risk of insuring the applicant.

BRIEF SUMMARY

Some or all of the above needs may be addressed by certain embodiments of the disclosed technology. Certain embodiments of the disclosed technology may include systems and methods for telematics monitoring. Certain embodiments of the disclosed technology may include systems and methods for scenario analysis and assertion.

Embodiments of the disclosed technology include systems and methods for telematics monitoring and communications. Briefly described, various embodiments of the disclosed technology may include systems and methods for monitoring driving behavior and/or motor vehicle telematic data through various combinations of devices that can include (1) one or more peripheral devices; (2) a mobile computing device configured for sensing certain phenomena and for receiving information from the one or more peripheral devices; and (3) a server in communication with the mobile computing device, and configured for receiving data from the mobile computing device.

According to certain example implementations of the disclosed technology, the data transmitted from the mobile computing device to the server may include telematic data derived from various combinations of the information received from the peripheral devices and/or from sensors associated with mobile computing device. Embodiments of the disclosed technology provide systems and methods for determining if a vehicle has been operated without being monitored by the mobile computing device. According to certain example embodiments of the disclosed technology, a particular vehicle may be positively identified by identification (ID) information received from a Vehicle Identification Unit. In another example embodiment, a particular vehicle may be identified via information provided by other in-car hardware. According to certain example embodiments of the disclosed technology, a particular vehicle may be identified by vibration, sound, or other phenomena that may be sensed by the mobile computing device.

A computer-implemented method is provided for receiving, at an Operational Measurement Unit (OMU), an operation indication associated with a first vehicle. The OMU includes an operational measurement component configured to advance an operational count in response to receiving the operation indication. The method further includes receiving, at a Vehicular Identification Unit (VIU), vehicular identification data related to the first vehicle, wherein the vehicular identification data includes identification (ID) data representing the first vehicle. The method further includes transmitting the operational count and the ID data wirelessly to a mobile computing device; receiving, at the mobile computing device, the transmitted operational count and the ID data; receiving, with the mobile computing device, sensor data from one or more sensors associated with the mobile computing device; and transmitting, by the mobile computing device to a remote server, telematics data, wherein the telematics data comprises at least a portion of one or more of the operational count, the ID data, and the sensor data.

Another computer-implemented method is provided, according to an example implementation, for receiving, at a mobile computing device, and from a Vehicle Identification Unit (VIU), identification (ID) data representing a first vehicle. The method may include receiving, by the mobile computing device, sensor data from one or more sensors associated with the mobile computing device; and transmitting, by the mobile computing device, telematics data, wherein the telematics data includes at least a portion of one or more of the ID data and the sensor data.

In certain embodiments, a method may include receiving, at an Operational Measurement Unit (OMU), an operation indication associated with the first vehicle. The OMU may include an operational measurement component configured to advance an operational count in response to receiving the operation indication. The method may include transmitting data representing the operational count wirelessly to the mobile computing device; receiving, at the mobile computing device, the transmitted operational count data; transmitting, by the mobile computing device, the telematics data, wherein the telematics data further comprises the operational count data.

A system is provided, according to an example implementation. The system includes an a vehicle identification unit (VIU), wherein the VIU is configured to provide identification (ID) data corresponding to a specific vehicle, wherein the VIU includes a transmitter for wirelessly transmitting the ID data. The system includes a mobile computing device that includes one or more sensors, at least one memory for storing data and computer-executable instructions, and at least one processor configured to access the at least one memory and further configured to execute the computer-executable instructions to receive the ID data from the VIU, receive sensor data from the one or more sensors, and transmit telematics data, wherein the telematics data may include at least a portion of one or more of the ID data and the sensor data.

A computer-readable media is also provided. The computer-readable media may be non-transient, and may store instructions that, when executed, cause one or more processors to perform a method for receiving, at a mobile computing device, and from a Vehicle Identification Unit (VIU), identification (ID) data representing a first vehicle. The method may include receiving, by the mobile computing device, sensor data from one or more sensors associated with the mobile computing device; and transmitting, by the mobile computing device, telematics data, wherein the telematics data includes at least a portion of one or more of the ID data and the sensor data.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE DISCLOSED TECHNOLOGY

Figure 1:
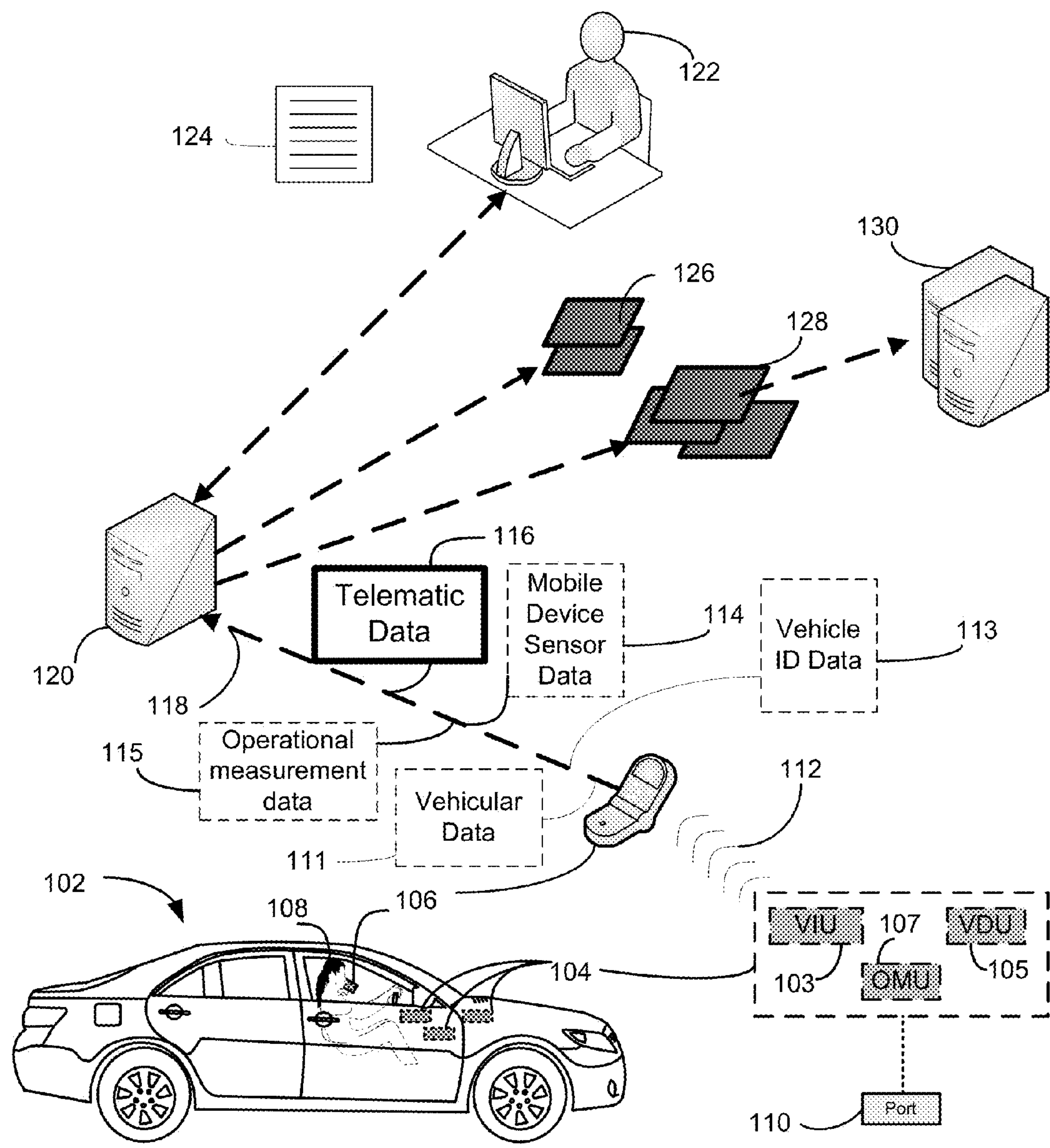
FIG. 1 illustrates an example block diagram of a telematics monitoring system, according to an example implementation of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase “in one embodiment” does not necessarily refer to the same embodiment, although it may. As used herein, unless otherwise specified the use of the ordinal adjectives “first,” “second,” “third,” etc., to describe a common object, merely indicate that different instances of like objects are being referred to, and are not intended to imply that the objects so described must be in a given sequence, either temporally, spatially, in ranking, or in any other manner.

As used herein, unless otherwise specified, the terms “mobile device” or “mobile computing device” may include a cellular phone, a smart phone, a tablet computer, a handheld mobile computing device, or a wearable mobile device that may be owned, carried, and/or utilized, for example, by an individual during the normal activities, which may include operating a vehicle. In certain example implementations of the disclosed technology, the mobile computing device may include devices utilized in systems such as OnStar, Chevrolet MyLink, Advanced Automatic Collision Notification, MyFord Touch, Ford Sync, BMW Assist, Dashtop mobile, GPS tracking, Lexus Link, Lojack Transmitters, and the like.

As used herein, unless otherwise specified, the terms “Vehicle Identification Unit,” “vehicle identification unit,” or “VIU,” may refer to a device utilized in conjunction with a vehicle. In certain example embodiments, the VIU may be utilized primarily for positively identifying a particular vehicle. According to certain example implementations of the disclosed technology, the VIU may be utilized in conjunction with vehicle identification (ID) data (for example, monitoring, receiving, storing, transmitting, etc.). As used herein, unless otherwise specified, the term “vehicle ID data” may include any number of types of data, including, but not limited to one or more of: vehicle identification information, IP address information and/or MAC address information from in-vehicle components, Bluetooth communications pairing data, data from an on-board diagnostics (OBD) port, voltage levels, vacuum levels, vibration, odometer readings, engine revolutions per minute, fuels levels, etc.

In other example embodiments, the VIU may provide additional functions. In certain example embodiments, the VIU may be a component of systems that may be configured perform functions associated with the VIU and other functions, as will be discussed below.

As used herein, unless otherwise specified, the terms “Operational Measurement Unit,” “operational measurement unit,” or “OMU,” may refer to a device for measuring operational count, representation of duration, or time. In certain example embodiments, the OMU device may be configured to advance a count when a signal such as an operation indication is received. Devices of this type may include, but are not limited to a Hobbs meter, a vehicle power activated timer, counter, or clock, a vibration activated timer, counter, or clock, etc. In certain example embodiments, the OMU may be utilized primarily for measuring operational time, a representation of operational duration, and/or an advancing (and stored) count associated with an operation of a vehicle. In certain example embodiments, the OMU may be a component or part of a system that may be configured perform functions associated with the OMU in addition to other functions, such as VIU functions, or VDU functions (as will be explained below).

As used herein, unless otherwise specified, the terms “Vehicle Data Unit,” “vehicle data unit,” or “VDU,” may refer to a device utilized in conjunction with a vehicle to receive and/or transmit vehicular data. As used herein, unless otherwise specified, the term “vehicular data” may include any number of types of data, including, but not limited to data from an on-board diagnostics (OBD) port, voltage levels, vacuum levels, vibration, odometer readings, engine revolutions per minute, fuels levels, temperature levels, pressure levels, etc. In certain example implementations, the term “vehicular data” may further include one or more of: IP address information and/or MAC address information from in-vehicle components, Bluetooth communications pairing data, etc. In certain example embodiments, such IP/Bluetooth/pairing data may also be associated with the VIU, as indicated above. The term “vehicular data” may also include data received from any commercial services or devices such as those associated with OnStar, Chevrolet MyLink, Advanced Automatic Collision Notification, MyFord Touch, Ford Sync, BMW Assist, Dashtop mobile, GPS tracking, Lexus Link, Lojack Transmitters, and the like.

According to certain example implementations, the VIU, VDU, and OMU may operate separately, and/or in combination without limitation. In certain example embodiments, one or more of the VIU, VDU, and OMU may be included in a system. For example, in one embodiment, a combination VIU, VDU, and OMU device may be placed in a vehicle and attached to a port in the vehicle. In another example implementation, one or more separate devices may be utilized for the various functions, and the devices may operate independent of each other. In example implementation, an OMU may be utilized without requiring the VIU or VDU. In another example implementation, the VIU may be utilized with the OMU without requiring the use of the VDU. In certain embodiments, the VDU may utilize vehicular data, and may additionally function as a complete OMU. In another embodiment, the VDU may function as a unit that receives and/or transmits vehicular data, provides OMU functions, and also provides VIU functions. It should be readily apparent that any combination or permutation of one or more of these three units may be utilized according to example embodiments of the disclosed technology.

According to one example embodiment, the devices such as those associated with OnStar, Chevrolet MyLink, Advanced Automatic Collision Notification, MyFord Touch, Ford Sync, BMW Assist, Dashtop mobile, GPS tracking, Lexus Link, Lojack Transmitters, and the like, may be considered as a VIU, depending on the provided functions and use of the provided data. In another example implementation, such devices may be considered as a VDU depending on the provided functions the use of the provided data. In other example embodiments, such devices may be considered as an OMU depending on the provided functions and provided data.

Certain example embodiments of the disclosed technology may enable a mobile computing device to be utilized as a monitoring and/or communications device for obtaining and/or communicating information related to certain activities associated with a user of the mobile computing device, including information related to the operation of a motor vehicle. Example embodiments of the disclosed technology may also provide for the use of the mobile computing device in conjunction with one or more peripheral devices that may communicate vehicular data, vehicular identification, and/or operational duration data to the mobile communication device. In certain example embodiments, the one or more peripheral devices may communicate certain data wirelessly to the mobile computing device.

According to an example implementation, data obtained by the systems and methods described herein may be provided by, or on behalf of, insurance carriers, employers, transportation manufacturers including, but not limited to, private passenger and fleet automobile motorcycle, capital farm and construction equipment, motor home, and trucking manufacturers, government entities and individual consumers for the purposes of determining driving performance of a specific vehicle or driver.

Although embodiments of the disclosed are anticipated to be useful for the insurance industry, certain systems and methods disclosed herein may be utilized in a wide variety of applications. For example, in certain embodiments, employers may use the disclosed technology for maintenance, training, and HR purposes. In certain embodiments, vehicles may be tracked and based on pre-existing knowledge of a vehicle. In certain embodiments, information received from the vehicle may be utilized to build a knowledge base, for example, a programmatic methodology utilize the disclosed technology to design maintenance schedules and replacements. In accordance with an example embodiment, drivers associated with an assigned vehicle may be effectively monitored for adherence to performance based guidelines such as obeying traffic laws and speed limits, as well as defined company standards. Other users of embodiments of the disclosed technology may include, but are not be limited to, government agencies (for insurance, human resource/employment, traffic safety/research purposes), youthful, newly licensed, and restricted driver/vehicle monitoring programs, (and other defined and undefined purposes), commercial fleet management of vehicles in service, rental agencies (private passenger automobile and commercial rental (vehicle or equipment) for rental, usage, geo-fencing and asset tracking), and consumer protection applications related to a vehicle's history and operational background (example: Carfax, Autocheck vehicle history services). Embodiments of the disclosed technology may also be implemented as a process for collecting data to be used for the following insurance and non-insurance related purposes: advertising and marketing; site selection; transportation services; land use planning; determining road design, surface or composition; traffic planning and design; and road conditions.

According to an example embodiment, the mobile computing device may be configured with at least one processor, and a memory in communication with the at least one processor that stores data and instructions. The instructions, for example, may be embodied as a mobile application, that when executed by the at least one processor may cause the with a mobile computing device to monitor/gather/communicate information related to certain activities associated with a user of the mobile computing device and/or the information related to the operation of a motor vehicle. In an example embodiment of the disclosed technology, activities related to risk of operating a vehicle (such as speed, braking, etc.,) may be monitored. In another example embodiment of the disclosed technology, activities that may not be necessarily related to risk of operating a vehicle (such as ignition operation time, fluid levels, etc.,) may be monitored.

Certain example embodiments of the disclosed technology may enable identifying individuals based on information received from their mobile computing device. Example embodiments of the disclosed technology may utilize scenario and/or assertion analysis in the determination of information about the individual in possession of a mobile device. For example, individuals generally hold their mobile phones or computing devices in a certain way while taking and/or walking. Some individuals, for example, utilize hands-free devices, while other individuals hold their mobile device predominantly in either the left hand or the right hand. According to an example embodiment, sensors in the mobile device, such as accelerometers and/or gyroscopes, magnetometers, etc., may be utilized to detect the tilt angle of the device, and may be utilized to distinguish one user of the device from another user.

In accordance with an example embodiment of the disclosed technology, a walking "signature" of an individual, may be detected by sensors associated with the mobile device. For example, information such as global positioning system (GPS) data, accelerometer data, magnetometer data, and/or gyroscope data may be analyzed and/or compared with previously obtained information to determine phone tilt, location, oscillation, movement signatures, etc. According to certain example embodiments, such information and analysis may be utilized to distinguish one user of the device from another user. Other example embodiments may utilize other various sensors associated with the mobile computing device, including the microphone, clock data, Bluetooth data, and/or Wi-Fi system data to extract information about the user. For example, the information obtained from the mobile device may be utilized for identifying one or more of an individual in possession of, or associated with the mobile computing device, characteristics of an individual in possession of or associated with the mobile computing device, and/or one or more vehicles in proximity to the mobile device.

According to example embodiments of the disclosed technology, information related to the mobile computing device tilt, location, oscillation, vibration, movement signatures, etc., may form a "user fingerprint" that may be utilized for establishing primary or secondary evidence. For example, an insurance company may investigate a car wreck where the insured claims that he/she was not driving the car. Example embodiments of the disclosed technology may be utilized to draw certain conclusions about who was driving, how fast they were going at the time of the accident, if there were any risky or abnormal behaviors prior to the accident, etc.

A mobile computing device solution is disclosed herein in various embodiments that may utilize an insurance policyholder's own mobile computing device (such as a smart phone or the like) to leverage cellular data and on-device functionality of the mobile communication device in such a way that may provide carriers a cost-effective option for deployment driving behavior tracking technology. Because of the need to positively identify when driving is taking place, the addition of a vehicle identification unit (VIU) is disclosed herein. In one example implementation, the VIU may be attached to the on-board-diagnostic (OBD) port of the vehicle. In another example implementation, the VIU device may be supplied by the original equipment manufacturer (OEM). In another example implementation, the in-vehicle VIU device may be an aftermarket device that can positively identify the vehicle (for example, via GM OnStar, Ford Sync, a hands-free speakerphone interface, or other technology as previously discussed). According to other example implementations, the VIU device may be configured to plug into a port on the vehicle that may supply power to the device and/or provide communications with another component associated with the vehicle. The port may be, for example, standard or custom, and may include (but is not limited to) a USB port, cigarette lighter outlet, etc. According to an example implementation, a wireless communication link from the VIU to the policyholder's smartphone may be implemented, for example, via Bluetooth or any other suitable communications method.

Certain example implementations of the disclosed technology may monitor, analyze, and utilize telematic information for various purposes including, but not limited to, determining premiums for auto insurance purposes. For example, by utilizing the various embodiments disclosed herein, certain monitored data may indicate dangerous and/or safe driving behaviors, habits etc., and such data may be monitored directly while a subject drives a vehicle. In certain example embodiments of the disclosed technology, the monitored information may be stored, analyzed, and utilized for various purposes, including but not limited to assessing the risk of a particular driver having an accident, calculating insurance premiums accordingly, providing feedback for the driver or entities associated with the driver (for example, parents of teen driver), marketing activities, traffic planning, safety studies, etc. According to one example use case, a driver who drives long distance at high speed may be charged a higher insurance rate than a driver who drives short distances at slower speeds.

Various systems and techniques may be utilized for identity analysis and assertion verification, according to example embodiments of the disclosed technology. Example embodiments of the disclosed technology may provide for the utilization of a mobile computing device as a monitoring and/or communications device for obtaining and/or communicating information related to certain activities associated with a user of the mobile computing device, including information related to the operation of a motor vehicle. These and other aspects of the disclosed technology will now be described with reference to the accompanying figures.

FIG. 1 illustrates an example block diagram of a telematics monitoring system, according to an example implementation of the disclosed technology. In an example implementation, one or more peripheral devices 104 may be installed or placed in or on a vehicle 102. In one example embodiment, the one or more peripheral devices 104 may be connected to a port 110 associated with the vehicle 102. In one embodiment, the port 110 may be an on-board-diagnostic (OBD) port. As discussed above, and according to another example embodiment, the port 110 may be a USB port. According to other example embodiments, the port 110 may be cigarette lighter port.

In accordance with certain example embodiments of the disclosed technology, the one or more peripheral devices 104 may include one or more combinations of a Vehicle Identification Unit (VIU) 103, a Vehicle Data Unit (VDU) 105, and an Operational Measurement Unit (OMU) 107. Some of the various embodiments, combinations, operation, etc. associated with the VIU 103, VDU 105, and OMU 107 were discussed above with regard to example definitions of these acronyms.

According to an example embodiment, a driver 108 of the vehicle 102 may possess, own, or otherwise carry with them, a mobile computing device 106. In this example figure, the mobile computing device may be referred to as a smartphone 106. In an example implementation, a special-purpose mobile application may be downloaded and installed on the smartphone 106, and may run in the background. In an example implementation, the one or more peripheral devices 104 may include one or more wireless transceivers or transmitters that may provide wireless communications 112 to the smartphone 106. For example, any data that is presented to and/or generated, alone or in combination, by the VIU 103, VDU 105, and/or OMU 107 may be transmitted to the smartphone 106 via the wireless communications 112 channel. In another example implementation, the one or more peripheral devices 104 may be configured with a communications hard-wired port for programming and/or wired communications.

In one embodiment, the port 110 may be an on-board diagnostic (OBD) port associated with the vehicle. In this embodiment, the one or more peripheral devices 104 may be connected to the OBD port, for example, to receive power and/or OBD data. The mobile application running on the smartphone 106, for example, may be configured to allow the smartphone 106 to detect when it is in the presence of the one or more peripheral devices 104, and may cause the smartphone 106 to pair with one or more of the peripheral devices 104 and setup a wireless communications 112 channel whenever the smartphone 106 is within the wireless range of the one or more peripheral devices 104. In one example embodiment, the wireless range may be less than 10 feet. In other example embodiments, the wireless range may be less than 5 feet. According to an example implementation, the smartphone 106 may wirelessly receive data from the one or more peripheral devices 104.

In accordance with example embodiments of the disclosed technology, the term "telematic data," (for example, the telematic data 116) may include (but is not limited to) various combinations of one or more of mobile device sensor data 116 (which, for example, may be provided by sensors associated with the smartphone 106 or other peripheral devices), vehicular data 111 (which, for example, may be provided by the VDU 105), operational measurement data 115 (which, for example, may be provided by the OMU 107, and/or vehicle ID data 113 (which, for example, may be provided by the VIU 103. Note that the VIU 103, VDU 105, and OMU 107, along with the respective data 113, 111, 115 are depicted in dashed-line boxes, indicating that various embodiments disclosed herein may include combinations of one or more of these devices. Furthermore, the connection to the port 110 is indicated in dashed lines to indicate that various embodiments disclosed herein may utilize information and/or power from the port, while other embodiments disclosed herein may not need to utilize the information and/or power from the port. In accordance with an example implementation of the disclosed technology, the mobile computing device, (for example, the smartphone 106) may receive sensor data from one or more of the associated VDU 105, OMU 107, or VIU 103 units. For example, the OMU 107 may provide to the mobile computing device, time information, which may be considered as sensor data. In other example embodiments, the mobile computing device (for example, the smartphone 106) may receive sensor data from sensors that are physically included on or within the mobile computing device.

In accordance with an example implementation of the disclosed technology, data received from a port 110 (for example, an OBD port, or other device associated with the vehicle 102) may provide certain paring data, peripheral device MAC address data, vehicle identification data, operational duration count data, etc., than may also be considered collectively as telematic data 116. As discussed above, one or more sensors associated with the smartphone 106 may be utilized to sense/gather certain mobile device sensor data 114 associated with operation of the vehicle 102 and/or signature information associated with the driver 108 and/or insured entity. For example, Table 1 below lists some of the example mobile device sensor data 114 that may be monitored via the smartphone 106. Other mobile device sensor data 114 not listed in Table 1 may be available for monitoring, and may be utilized without departing from the scope of the disclosed technology.

TABLE 1

Example mobile computing device (smartphone) sensor data 114

| RAW Mobile Application Data Element | Sensor Name or CALCULATED | Description |
|---|---|---|
| [email] | N/A | Email Address of Policy Holder |
| [id] | N/A | Unique ID assigned to the participant |
| [SystemID] | TELEPHONY_API | CDMA System ID |
| [BaseStation Longitude] | TELEPHONY_API | CDMA Base Station Longitude |
| [BaseStation] | TELEPHONY_API | CDMA Base Station ID |
| [Accuracy] | GPS | Returns the accuracy of the fix in meters |
| [PhoneType] | TELEPHONY_API | PhoneType |
| [AccelerationZ] | ACCELEROMETER | Acceleration on the z-axis |
| [AccelerationY] | ACCELEROMETER | Acceleration on the y-axis |
| [AccelerationX] | ACCELEROMETER | Acceleration on the x-axis |
| [Inclination] | CALCULATED | inclination |
| [BaseStationLatitude] | TELEPHONY_API | CDMA Base Station Latitude |
| [Roll] | ORIENTATION | rotation around y-axis (−90 to 90), with positive values when the x-axis moves toward the z-axis |
| [Speed] | GPS | Returns the speed of the device over ground in meters/second. |
| [Altitude] | GPS | Returns the altitude of this fix |
| [Time] | GPS | Returns the UTC time of this fix, in milliseconds since Jan. 1, 1970. |
| [NetworkID] | TELEPHONY_API | CDMA Network ID |
| [Hobbs Time] | OBD Hobbs Meter | Mirrored time count saved on phone |
| [Cid] | TELEPHONY_API | GSM Cid |
| [Battery] | BATTERY | Battery Level % |
| [Azimuth] | ORIENTATION | Angle between the magnetic north direction and the y-axis, around the z-axis (0 to 359). 0 = North, 90 = East, 180 = South, 270 = West |
| [Lac] | TELEPHONY_API | GSM Lac |
| [Latitude] | GPS | Returns the latitude of this fix |
| [Longitude] | GPS | Returns the longitude of this fix |
| [Bearing] | GPS | Returns the direction of travel in degrees East of true North. |
| [Provider] | GPS | Returns the name of the provider that generated this fix, or null if it is not associated with a provider |
| [Pitch] | ORIENTATION | Rotation around x-axis (−180 to 180), with positive values when the z-axis moves toward the y-axis |
| [SessionID] | CALCULATED | GUID Session identifier for EACH application startup |
| [LinearAccelerationX] | LINEAR_ACCELEROMETER | Linear Acceleration on the x-axis |
| [LinearAccelerationY] | LINEAR_ACCELEROMETER | Linear Acceleration on the y-axis |
| [LinearAccelerationZ] | LINEAR_ACCELEROMETER | Linear Acceleration on the z-axis |
| [GeoMagneticX] | MAGNETIC | Geo Magnetic on the x-axis |
| [GeoMagneticY] | MAGNETIC | Geo Magnetic on the y-axis |
| [GeoMagneticZ] | MAGNETIC | Geo Magnetic on the z-axis |
| [GravityX] | GRAVITY | Gravity on the x-axis |
| [GravityY] | GRAVITY | Gravity on the y-axis |
| [GravityZ] | GRAVITY | Gravity on the z-axis |
| [RotationPitch] | CALCULATED | Rotation around the X axis in radians and positive in the counter-clockwise direction |
| [RotationRoll] | CALCULATED | Rotation around the Y axis in radians and positive in the counter-clockwise direction |
| [RotationInclinationX] | CALCULATED | X Inclination Matrix Value |
| [RotationInclinationY] | CALCULATED | Y Inclination Matrix Value |
| [RotationInclinationZ] | CALCULATED | Z Rotation Matrix Value |
| [RotationX] | CALCULATED | X Rotation Matrix Value |
| [RotationY] | CALCULATED | Y Rotation Matrix Value |
| [RotationZ] | CALCULATED | Z Rotation Matrix Value |
| [RotationAzimuth] | CALCULATED | Rotation around the Z axis in radians and positive in the counter-clockwise direction |

In accordance with certain example embodiments of the disclosed technology, the telematic data 116 (which in some embodiments may include various combinations of the mobile device sensor data 114, vehicle identification data 113, vehicular data 111, and/or operational measurement data 115) may be transmitted wirelessly by an available communication channel 118 from the smartphone 106 to a server 120. In one example embodiment, the communication channel 118 may include a cellular carrier (not shown). Other communications channels may be utilized for communicating data to the remote server 120, as know to those skilled in the art, and for brevity, will not be discussed here in detail.

In certain example embodiments, various functions and/or activities may be carried out or otherwise associated with the server 120. For example, and with continued reference to FIG. 1, the server 120 may include a database for storing the received telematic data 116. In certain example embodiments, the received telematic data 116 may be analyzed and formatted, for example in an easy to understand report or webpage 124 that may be retrieved by a policy holder and/or insurance carrier 122 (an example of such a webpage 122 is depicted below in FIG. 4).

According to certain example embodiments, analytics 126 may be generated, for example, based on telematic data 116 and other various data sources may be utilized to generate analytics 126. In certain example embodiments, the telematic data obtained from a plurality of drivers and sources may be analyzed to provide analytics and other value-added risk data 128 that may be provided to various insurance carriers 130, for example to allow risk scoring an individual based on statistical driving data take from a larger population.

Figure 2:
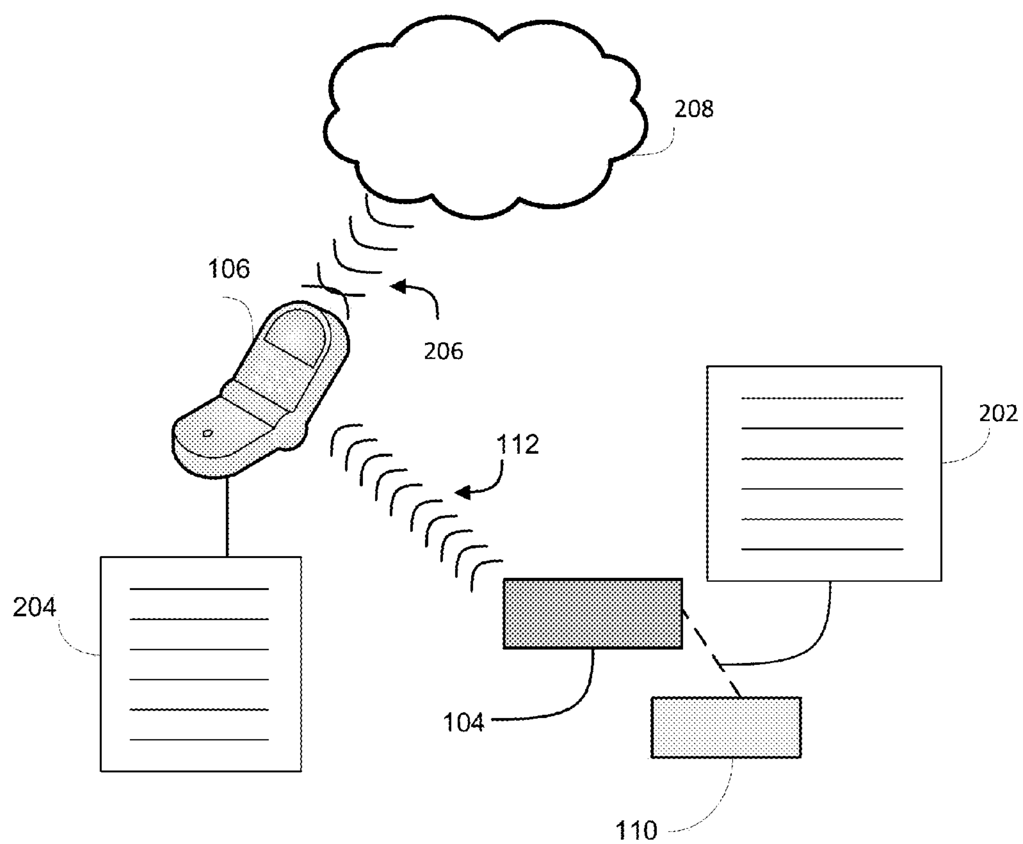
FIG. 2 illustrates an example block diagram of wireless communications between a vehicle identification unit device and a mobile computing device according to an example embodiment of the disclosed technology.

FIG. 2 illustrates a simplified example block diagram of wireless communications between one or more peripheral devices 104 and a mobile computing device 106, as discussed above in reference to FIG. 1. Similarly, the according to an example embodiment of the disclosed technology, the data 204 derived from sensors associated with the smartphone 106 may be similar to the data shown above in Table 1. According to an example embodiment, the smartphone 106 may wirelessly communicate 206 to a remote server by any available communications channels, including but not limited to a cellular carrier, or through the Internet 208 via a wireless channel. In one example embodiment, the data received from the port 110 and/or the one or more peripheral devices 104 may be saved on the smartphone 106 when communications channels are not available, and such data may be loaded up to the remote server at a later time, for example, when the smartphone 106 is again in a cellular coverage area or is connected to the Internet 208 via Wi-Fi, for example.

Figure 3:
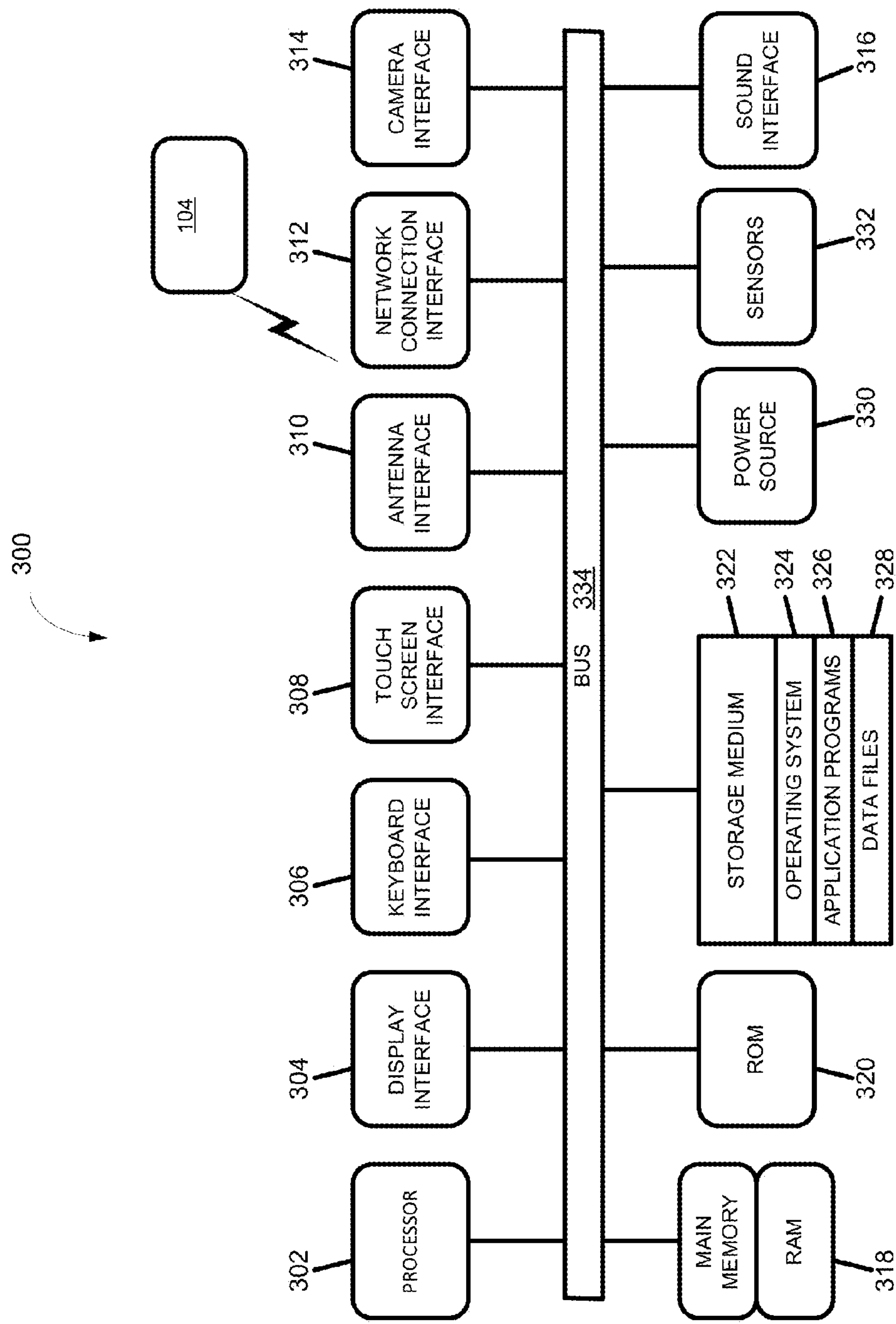
FIG. 3 illustrates an example block diagram of a computing device architecture, according to an example embodiment of the disclosed technology.

FIG. 3 depicts a block diagram of an illustrative computer system architecture 300 according to an example implementation. Certain aspects of FIG. 3 may be embodied in the mobile computing device (for example, the mobile device 106 as shown in FIGS. 1 and 2). Certain aspects of FIG. 3 may also be embodied in the remote server (for example, the server 120 as shown in FIG. 1). Various implementations and methods herein may be embodied in non-transitory computer readable media for execution by a processor. It will be understood that the architecture 300 is provided for example purposes only and does not limit the scope of the various implementations of the communication systems and methods.

The computing device 300 of FIG. 3 includes one or more processors where computer instructions are processed. The computing device 300 may comprise the processor 302, or it may be combined with one or more additional components shown in FIG. 3. For example, in one example embodiment, the computing device 300 may be the processor 302. In yet other example embodiments, the computing device 300 may be a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components. In certain example implementations of the disclosed technology, the mobile computing device may include devices utilized in systems such as OnStar, Chevrolet MyLink, Advanced Automatic Collision Notification, MyFord Touch, Ford Sync, BMW Assist, Dashtop mobile, GPS tracking, Lexus Link, Lojack Transmitters, and the like.

The computing device 300 may include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display 350 that is not necessarily physically connected to the mobile computing device. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to the external/remote display 350.

The architecture 300 may include a keyboard interface 306 that provides a communication interface to a keyboard; and a pointing device interface 308 that provides a communication interface to a pointing device or touch screen. Example implementations of the architecture 300 may include an antenna interface 310 that provides a communication interface to an antenna; a network connection interface 312 that provides a communication interface to a network. In an example implementation, a one or more peripheral devices 104 (which may be the same one or more peripheral devices 104 as shown in FIGS. 1 and 2) may communicate wirelessly with the processor 302 via the antenna interface 310. In certain implementations, a camera interface 314 may be provided that may act as a communication interface and provide functions for capturing digital images from a camera. In certain implementations, a sound interface 316 may be provided as a communication interface for converting sound into electrical signals using a microphone and for converting electrical signals into sound using a speaker. In one example embodiment, the sound interface 316 may be utilized to receive audible information, for example, from an engine associated with a vehicle. In other example embodiments, the sound interface may be utilized to monitor other sound that may be indicative of an accident, wearing automobile parts, etc.

According to example implementations, a random access memory (RAM) 318 may be provided, where computer instructions and data may be stored in a volatile memory device for processing by the processor 302. According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and data files 328 are stored. Application programs 326, for example, may include a web browser application, a widget or gadget engine, and or other mobile applications, as necessary for pairing with and receiving information from the VIU device 340, and for communications with the remote server.

According to an example implementation, the architecture 300 includes a power source 330 that provides an appropriate alternating current (AC) or direct current (DC) to power components. According to an example implementation, the architecture 300 includes one or more sensors 332 that can provide telematics data. Example sensors 332 may include, but are not limited to global position system (GPS) sensors, accelerometers, magnetometers, temperature sensors, clocks, and a compass. The constituent devices and the processor 302 may communicate with each other over a bus 334.

In accordance with an example implementation, the processor 302 has appropriate structure to be a computer processor. In one arrangement, the computer processor 302 may include more than one processing unit. The RAM 318 interfaces with the computer bus 334 to provide quick RAM storage to the processor 302 during the execution of software programs such as the operating system application programs, and device drivers. More specifically, the processor 302 loads computer-executable process steps from the storage medium 322 or other media into a field of the RAM 318 in order to execute software programs. Data may be stored in the RAM 318, where the data may be accessed by the computer processor 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
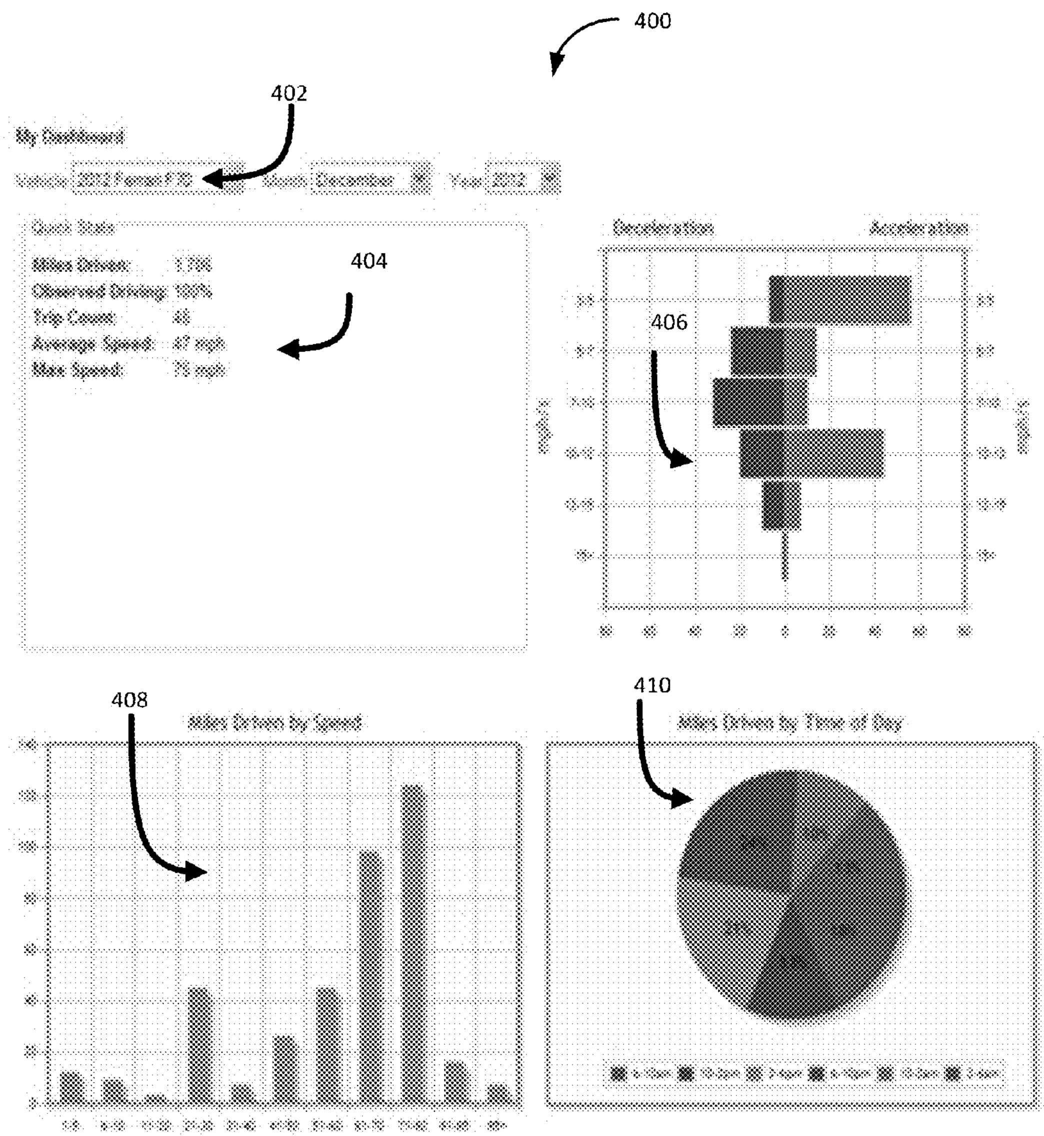
FIG. 4 depicts an illustrative webpage user interface with monitored telematics data, according to an example implementation of the disclosed technology.

FIG. 4 depicts an illustrative report or webpage user interface 400, with monitored telematic data (for example, telematic data 116 as shown in FIG. 1), according to an example implementation of the disclosed technology. The information presented in this example report or webpage user interface 400 may be similar to the data presented in the report or webpage 124 as shown in FIG. 1. In accordance with an example implementation, an authorized user may login to a website to view the information. In one example embodiment, the authorized user may be the insured driver. In another example implementation, the authorized user may be a representative of the insurance carrier. According to an example implementation, different information may be presented, depending on the credentials of the authorized user and/or or end use of the information. As shown in FIG. 4, and according to an example embodiment, a person viewing the webpage may select a vehicle 402 for which the telematic information is available. In an example implementation, a summary view 404 of the collected data may provide information, including but not limited to miles driven, percentage of the time that the driving was monitored by the smartphone and OBD device, number of trips, average speed, and maximum speed.

In accordance with an example implementation, the report or webpage user interface 400 may also include certain graphical representations that present the monitored telematics data. For example, an acceleration/deceleration chart 406 may be included to provide an indication of the drivers safety habits related to operating the motor vehicle. For example, a large number of extreme acceleration or deceleration incidents may be indicative of a driver who may present a high risk to the insurance carrier.

Additional data may be collected and presented in graphical format. For example, a breakdown of miles driven within certain speed ranges 408 may be presented, for example, to provide another risk dimension indication. For example, someone driving many miles at high speeds over a given period may present a higher insurance risk compared with someone who drove relatively few miles, and only at low speeds. Such information may provide much more insight as to the driver risk than could be gained by a figure of the number of miles driven per year.

Other additional data may be collected and presented in graphical format according to certain example embodiments of the disclosed technology. For example, a breakdown of miles driven per time of day 410 may be presented to provide additional risk insight. For example, many miles driven within the 2:00 am hour time slot may indicate an elevated risk.

Figure 5:
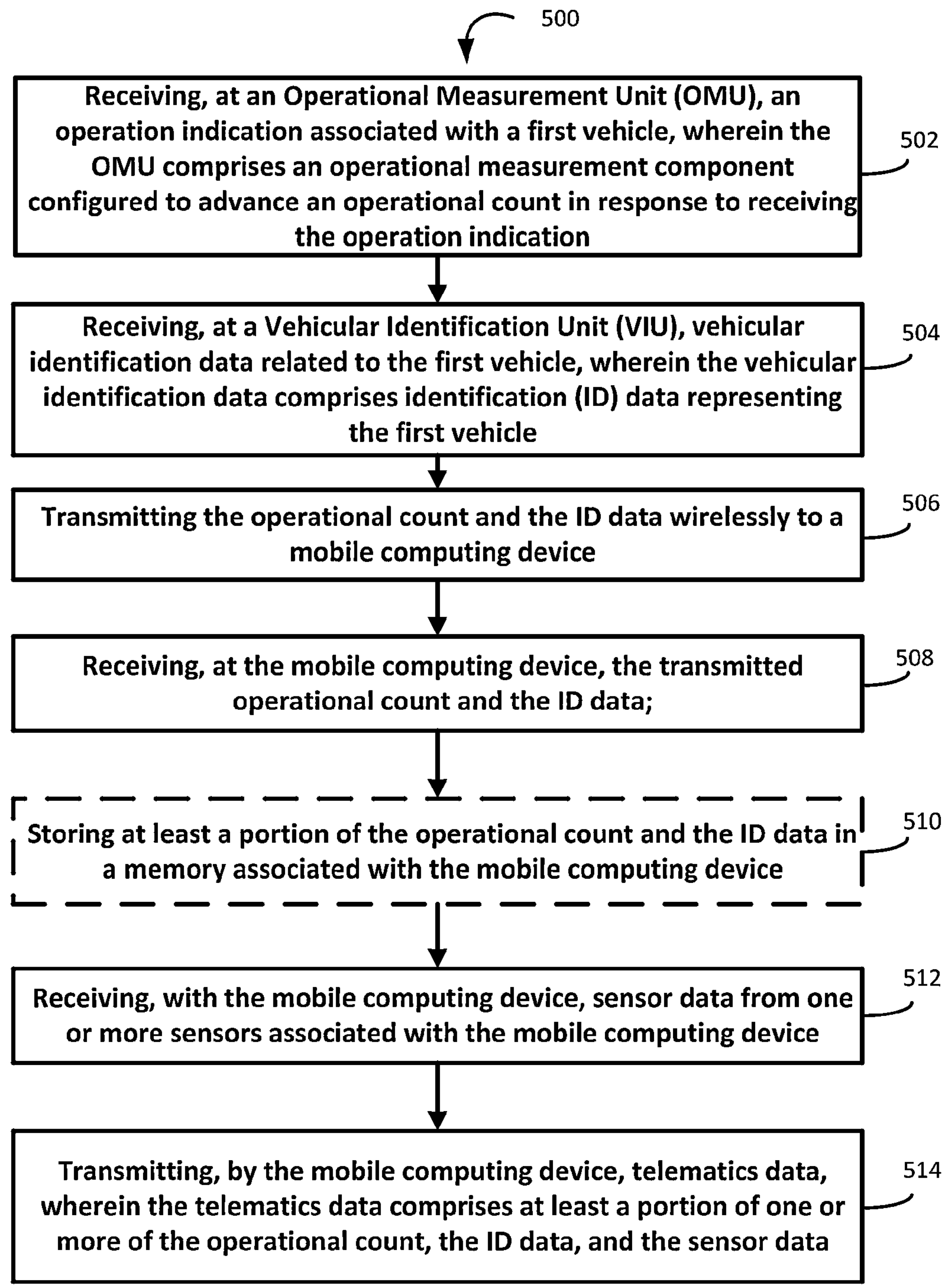
FIG. 5 depicts a method flow diagram, according to an example embodiment of the disclosed technology.

An example method 500 for monitoring and communicating telematic information will now be described with reference to the flowchart of FIG. 5. The method 500 starts in block 502, and according to an example implementation includes receiving, at an Operational Measurement Unit (OMU), an operation indication associated with a first vehicle, wherein the OMU comprises an operational measurement component configured to advance an operational count in response to receiving the operation indication. In block 504, the method 500 includes receiving, at a Vehicular Identification Unit (VIU), vehicular identification data related to the first vehicle, wherein the vehicular identification data comprises identification (ID) data representing the first vehicle. In block 506, the method 500 includes transmitting the operational count and the ID data wirelessly to a mobile computing device. In block 508, the method 500 includes receiving, at the mobile computing device, the transmitted operational count and the ID data. In block 510, the method 500 may optionally include (as indicated by the dashed box) storing at least a portion of the operational count and the ID data in a memory associated with the mobile computing device. In block 512, the method 500 includes receiving, with the mobile computing device, sensor data from one or more sensors associated with the mobile computing device. In block 514, the method 500 includes transmitting, by the mobile computing device to a remote server, telematics data, wherein the telematics data comprises at least a portion of one or more of the operational count, the ID data, and the sensor data.

In an example implementation the OMU may be in communication with a port associated with the first vehicle. In one example implementation, the port may be an OBD port. According to an example implementation, the operation indication may sensed by the OMU when the first vehicle is in an operating state. In an example implementation, transmitting the operational count and the ID data wirelessly to the mobile computing device may be based at least in part on the operation indication. In one example implementation, the mobile computing device may be configured to receive the sensor data based at least in part on the operation indication.

According to an example implementation of the disclosed technology, transmitting operational count and the ID data wirelessly to the mobile computing device may include transmitting data over one or more established communications channels in which the OMU and/or VIU are paired with the mobile computing device. Certain example embodiments include comparing, a first operational count with a second operational count, for example where the first and second operation count may be derived or associated from the received operational count data. In one example implementation, the first operational count may correspond to a previously stored end-of-vehicle-operation operational count, and the second operational count may correspond to a start-ofvehicle-operation operational count. Example embodiments may include providing an alert in response to the first operational count and second operational count differing by greater than a predefined threshold. In one example implementation, providing the alert may include one or more of transmitting, by the mobile computing device, a notification to the remote server, and generating a message for output by the mobile computing device. In another example implementation, providing the alert may be performed by a server in communication with the mobile computing device.

Example embodiments of the disclosed technology may include receiving and storing, at the remote server, the transmitted telematics data associated with the first vehicle. Example embodiments of the disclosed technology may include receiving and storing, at the remote server, telematics data associated with a plurality of vehicles. Example embodiments of the disclosed technology may include comparing at least a portion of the received telematics data from the first vehicle with telematics data from the plurality of vehicles to determine one or more risk factors associated with operating the first vehicle. Example embodiments of the disclosed technology may include receiving and storing, at the remote server, the transmitted telematics data associated with the first vehicle; and outputting at least a portion of the telematics data in graphical format. Example embodiments of the disclosed technology may include determining, based at least in part on the received telematics data, one or more entity scenarios comprising one or more assertions. Example embodiments of the disclosed technology may include comparing one or more attributes of the received telematics data with information from one or more data sources to determine a plurality of correlations. Example embodiments of the disclosed technology may include calculating a confidence level associated with the one or more assertions based at least in part on the determined plurality of correlations and outputting a score representative of the confidence level that the received telematics data comprises one or more attributes that correspond to the one or more assertions.

One embodiment may further include transforming the received telematics data, wherein the transforming comprises one or more of formatting, filtering, compressing, or validating the received telematics data. According to certain example embodiments, information from one or more data sources may include previously stored information having a class type corresponding to the received telematics data, wherein the class type comprises accelerometer data, magnetometer data, gyroscope data, clock data, global positioning system (GPS) data, Bluetooth system data comprising one or more of paring or disconnects, microphone signals, or Wi-Fi system data.

In certain embodiments, determining the one or more entity scenarios comprising one or more assertions includes identifying one or more of an individual in possession of or associated with the mobile computing device, characteristics of an individual in possession of or associated with the mobile computing device, and a vehicle in proximity to the mobile device and associated with the VIU. Example embodiments of the disclosed technology may include comparing one or more attributes of the received data with information from one or more data sources comprises comparing one or more of repeat location visits, repeatable events, velocity, acceleration, location at a specific time, body patterns, habits, data attributes indicative of education level, data attributes indicative of age, data attributes indicative of gender, data attributes indicative of behavior risks, or groups of events.

According to an example implementation, a method may further include receiving and storing, at the remote server, the transmitted telematic data associated with the first vehicle and receiving and storing, at the remote server, OBD data and the mobile device sensor data associated with a plurality of additional vehicles. The method may include comparing at least a portion of the telematic data to determine risk associated with certain driving data. The method may further include receiving and storing, at the remote server, the transmitted telematic data associated with the first vehicle; and outputting at least a portion of the telematic data in graphical format.

An example implementation of the disclosed technology may include a monitoring system that can include a personal data unit, a communication unit, and an analysis unit. The personal data unit can receive personal data about the insurance applicant, including a telephone number or other identifier of a mobile communication device, for example, a smartphone used by an insurance applicant or policyholder. The communication unit may receive location data related to the mobile communication device, where the location data describes various locations of the mobile communication device over time. In some embodiments of the monitoring system, the communication unit can periodically contact the mobile communication device itself to receive periodic location updates. Alternatively, however, the communication unit can receive historical location data from a data center, such as a mobile service provider, associated with the mobile communication device. The analysis unit can analyze the location data to determine movements of the mobile communication device and, thus, a pattern of usage of a motor vehicle used by the insurance applicant. Analysis of the location data may be used, for example, by an insurance provider to determine a level of risk for insuring an applicant.

Certain example embodiments of the disclosed technology may include a mobile smartphone application. For example, embodiments of the smartphone application may be compatible with mobile device operating systems (such as Andriod, iOS, Windows, etc.). The smartphone application(s) may be configured to launch and run in the background of a driver's (or policyholder's) smartphone and may monitor data. According to an example implementation, the monitored data may be uploaded via the policyholder's smartphone data connection to one or more remote servers, where the information may be stored and analyzed. Beyond an initial configuration/pairing with the one or more peripheral devices, there may be no need for additional user interaction via the smartphone application.

In accordance with an example implementation, once the driving data is uploaded to the remote server and stored in a database, entities authorized to access driving information for the particular driver may be able to receive a file of driving information in a standard output format. Once sufficient data has been collected, a driving model may be created for which a driving score may be determined based on the monitored data. According to an example implementation, authorized entities may be able to receive or access the driving score for an individual driver based upon the individualized data stored within the database.

According to certain example embodiments, an authorized entity may be able to access information about their driving data in a consumer-friendly format. In one instance, the authorized entity may be the driver of the vehicle and the policyholder. In another instance, the authorized entity may be the policyholder, but not the driver (for example, a parent of a driver). In another example embodiment, the authorized entity may be responsible, or otherwise associated with a vehicle fleet, and may access the data to better understand information related to the various vehicles and/or drivers. For example, according one embodiment, an authorized entity may access information via a website (as discussed with reference to FIG. 4 above). Additional ways of accessing and/or viewing consumer-friendly driving information may include integration of the information into a web site (for example, via direct web API calls), or through simple reports that can be provided as part of a normal consumer disclosure process within existing framework.

Certain example embodiments of the disclosed technology may rely on an independent database. Collected data, for example, may be supplied to the independent database by a combination of data elements from the mobile computing device and the vehicle identification unit device that is paired to the mobile computing device.

In accordance with an example implementation, the mobile application may be configured to communicate with various peripheral in-vehicle devices, such as for example, the ELM-based OBD-II device and/or BlueDriver OBD-II device. One example embodiment may rely on a Bluetooth connection to provide a wireless communication channel to connect the one or more peripheral devices and interface with the smartphone or mobile computing device. However, it will be recognized that any suitable communication channel may be used for delivering information from the one or more peripheral devices to the mobile computing device without departing from the scope of the disclosed technology.

In an example implementation, a detected event may indicate the beginning of "trip" and may cause the start the data collection/transmission. For example, the event may be when the one or more peripheral devices 104 are "woken up" when the vehicle 102 is started and the connection between the one or more peripheral devices 104 is established with the mobile device 106. In an example implementation, another event may be utilized to indicate the end of "trip" and end the data collection/transmission. For example, this event may be when the one or more peripheral devices 104 is "put to sleep" when the vehicle 102 is turned off and the connection between the one or more peripheral devices 104 is terminated with the mobile device 106. One example of this implementation is the use of an Operational Measurement Unit (OMU) 107 (such as a Hobbs meter) associated with the one or more peripheral devices 104, and will be further explained in detail below with reference to FIG. 7.

Figure 6:
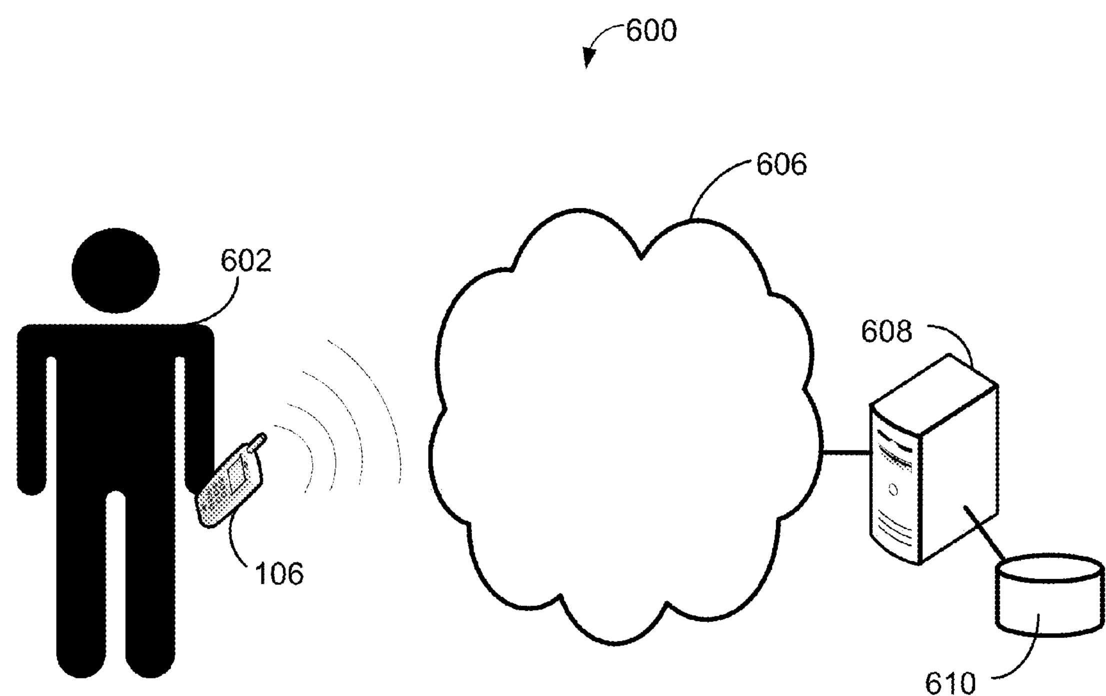
FIG. 6 is a block diagram of an illustrative system usage scenario 600 according to an example embodiment of the disclosed technology.

FIG. 6 is a block diagram of an illustrative system usage scenario 600 according to an example embodiment of the disclosed technology, which may be utilized, at least in part to confirm an identity of an individual 602 based, for example, on signature data obtained via sensors associated with a mobile computing device 106. In one embodiment, an individual 602 may be in possession of a mobile computing device 106 that may be in communication with a server 608 via a cellular or Wi-Fi network 606. In accordance with an example embodiment, the server 608 may analyze data received from the mobile computing device 106. In one embodiment, the server 608 may filter or select certain data. According to certain example embodiments, the server 608 may store at least a portion of the data received from the mobile computing device 106 in a memory or data storage repository 610. Accordingly, previously stored data from the data storage repository 610 may be retrieved and compared with received data from the mobile computing device 106.

Figure 7:
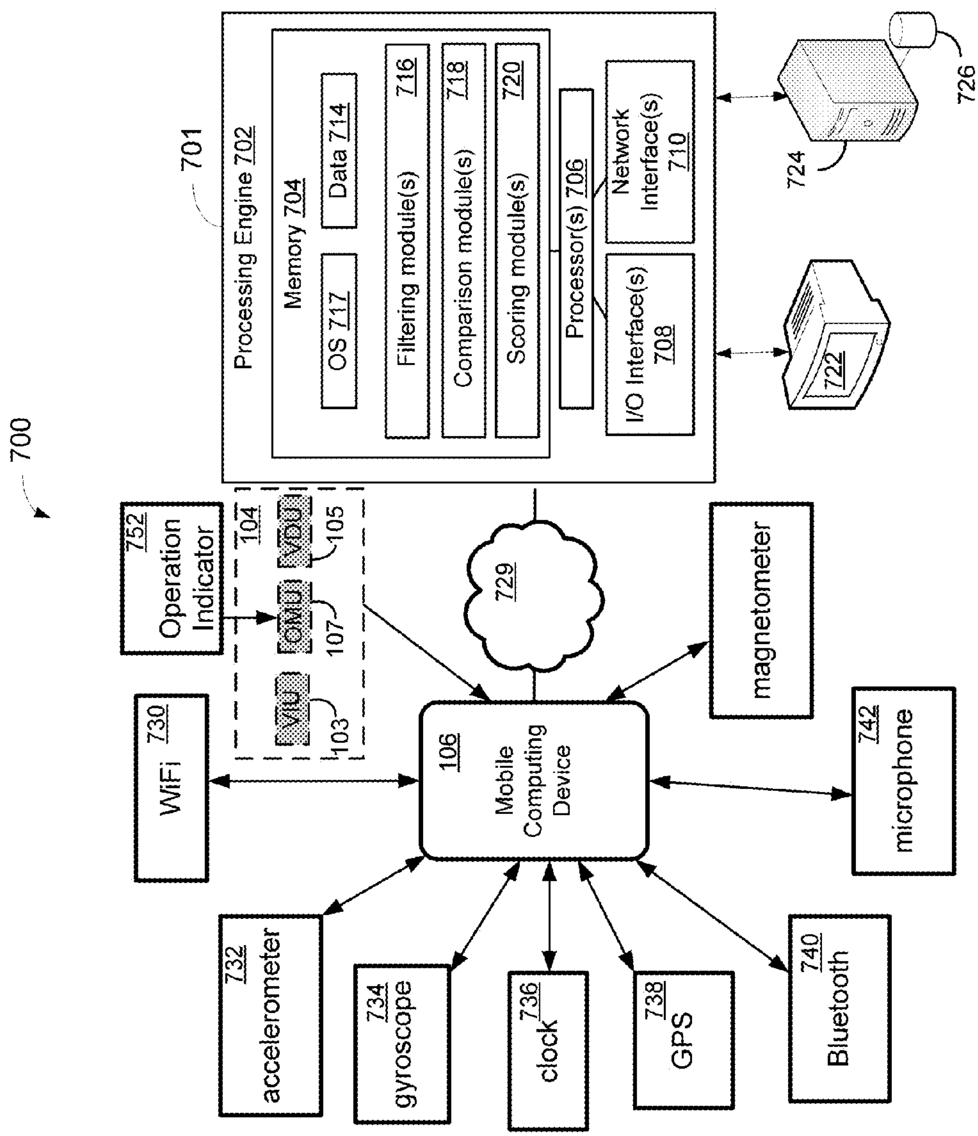
FIG. 7 is an illustrative example telematics system 700, according to an example embodiment of the disclosed technology.

FIG. 7 depicts an example telematics system 700, according to an example embodiment of the disclosed technology. According to certain example embodiments, a processing system 701 may be utilized to receive, process, filter, score, compare, etc., information obtained from a mobile computing device 106. According to an example embodiment, the a processing system 701 may include a processing engine 702 that includes a memory 704, one or more processors 706 in communication with the memory 704, one or more input output interfaces 708, and one or more network interfaces 710.

In an example embodiment, the memory 704 may include an operating system 712, data 714, and a number of modules for handling data. For example, the memory 704 may include one or more filter modules 716 that may be utilized to modify received data. For example, the one or more filter modules 716 may perform one or more of the following: bandwidth filtering, noise reduction, artifact isolation, band-limiting, sampling, digital signal processing, etc. In accordance with certain example embodiments, the memory 704 may also include one or more comparison modules 718. For example, one or more comparison modules 718 may be utilized to determine similarities or differences between incoming data from the mobile computing device 106 and retrieved data that has been previously stored in memory 704 or in a data repository 726. According to certain example embodiments, the one or more comparison modules 718 may be utilized to perform correlation, convolution, frequency analysis, matching, transformation, vector analysis, multivariate analysis, etc.

In accordance with example embodiments of the disclosed technology, the memory 704 may include one or more scoring modules 720. In certain embodiments, the scoring modules 720 may be utilized for calculating a confidence level associated with one or more assertions based at least in part on the processing by the one or more comparison modules 718. In accordance with certain example embodiments, a score representative of the confidence level that the received plurality of data includes one or more attributes that correspond to the one or more assertions may be output, for example, to a display 722 via the input/output interface 708, or it may be sent to a local or remote computer 724 and/or a data repository 726.

According to example embodiments of the disclosed technology, and with continued reference to FIG. 7, the mobile computing device 106 may communicate with the processing system 701 via any available channel 729, which may include, but is not limited to, one or more wireless cellular communications channels, Wi-Fi, Bluetooth, Zigbee, etc. As depicted in FIG. 7, a number of sensors or functions associated with the mobile computing device 106 may provide information or data that may be processed by the processing system 701. For example, according to one embodiment, SSID information from a nearby Wi-Fi hotspot may be obtained by the mobile computing device 106 Wi-Fi transceiver 730 to provide location data.

In an example embodiment, a magnetometer, an accelerometer 732 and/or gyroscope 734 associated with the mobile computing device 106 may provide tilt, attitude, or angle information. In accordance with an example embodiment, a clock 736 may be utilized for time stamping some, any, or all of the data sent from the mobile computing device 106 to the processing system. In an example embodiment the clock 736 may be utilized to time certain events. In another example embodiment, the clock 736 may be utilized for mirroring time provided by the Operational Measurement Unit (OMU) 107 (as will be described below).

In accordance with certain example embodiment, a global positioning system (GPS) 738 may provide location data. In certain example embodiments, a Bluetooth transceiver 740 may provide information such a pairing and disconnects with other Bluetooth devices. According to certain example embodiments, a microphone 742 associated with the mobile computing device 106 may be utilized for obtaining sounds from a local environment in which the mobile computing device 106 resides. For example, the microphone 742 may be utilized to pick-up sounds associated with automobiles and the processing system 701 may be able to analyze the sound information to distinguish between vehicles. Other sensors, including RFID tag readers, cameras, etc., may be used in conjunction with the mobile computing device 106 to provide additional information to the processing system 701 in accordance with example embodiments without departing from the scope of the disclosed technology.

According to an example embodiment, one or more peripheral device 104 may be on communication with the mobile computing device 106. For example, the one or more peripheral devices 104 (as previously described with reference to FIG. 1) may include one or more of a VIU 103, a VDU 105, and/or an OMU 107. In one example implementation, the OMU 107 may be a device, such as a Hobbs meter, vehicle power activated clock, or the like. The OMU 107 may be utilized to produce an accumulated count corresponding to operation of a vehicle. For example, the OMU 107 may advance a count when an operation indication 752 is received, signifying that the vehicle is running. In an example implementation, example, the OMU 107 may include a memory that saves the last advanced count when (power or) the operation indication 752 is no longer applied. For example, the operation indicator 752 may include an indication that the ignition of a vehicle is in an "on" state. In another example embodiment, the operation indicator 752 may be present when power is supplied to the OMU 107.

In one example embodiment, the OMU 107 may be a stand-alone component. In other example embodiments, the OMU 107 may included as a component associated with (or in combination with) the VIU 103 and/or the VDU 105. In an example embodiment of OMU 107, account may start advancing each instance that the vehicle is started, continue to advance for the duration of the vehicle operation, then stop advancing when the vehicle is turned off. In an example embodiment, the count may be stored in non-volatile memory so that, upon subsequent operation of the vehicle, the count value starts from the last previously generated count value (and saved to non-volatile memory) just prior to the vehicle being turned-off in the previous period of operation.

In an example implementation of the disclosed technology, the time count from the OMU 107 may be communicated to the mobile computing device 106 (for example, wirelessly when paired). In one example implementation, the count may be used to update a "mirrored" time count on the mobile computing device to synchronize with the operational count on the OMU 107. In one example embodiment, synchronization may be handled, in part by the in conjunction with the clock 736. In another example embodiment, synchronization or the mirrored time count on the mobile computing device may rely only on the data received from the OMU 107. In one example embodiment, the application on the mobile computing device, upon paring, may compare its last saved mirrored time count to the time count that is being communicated by the OMU 107.

In one scenario, if the operational count representation on the mobile computing device 106 matches (or is within a small predetermined error range) of the operational count representation on the OMU 107, then it may be concluded that the vehicle has been monitored by the mobile communication device during its previous operation. In another scenario, if the counts on the OMU 107 do not match those of the stored mirrored counts on the mobile communication device 106, or if they differ more than a predetermined threshold, then it may be concluded that the vehicle was driven or otherwise operated without being monitored by the mobile communications device. For example, someone other than the primary policyholder may have driven the vehicle, or the mobile communications device may have been powered down or not present. Such information may indicate that the vehicle was operated without being monitored by a specific mobile computing device. In one example embodiment, any discrepancy between the stored operational count representation on the mobile computing device 106 and the OMU 107 may be saved, reported, etc.

Figure 8:
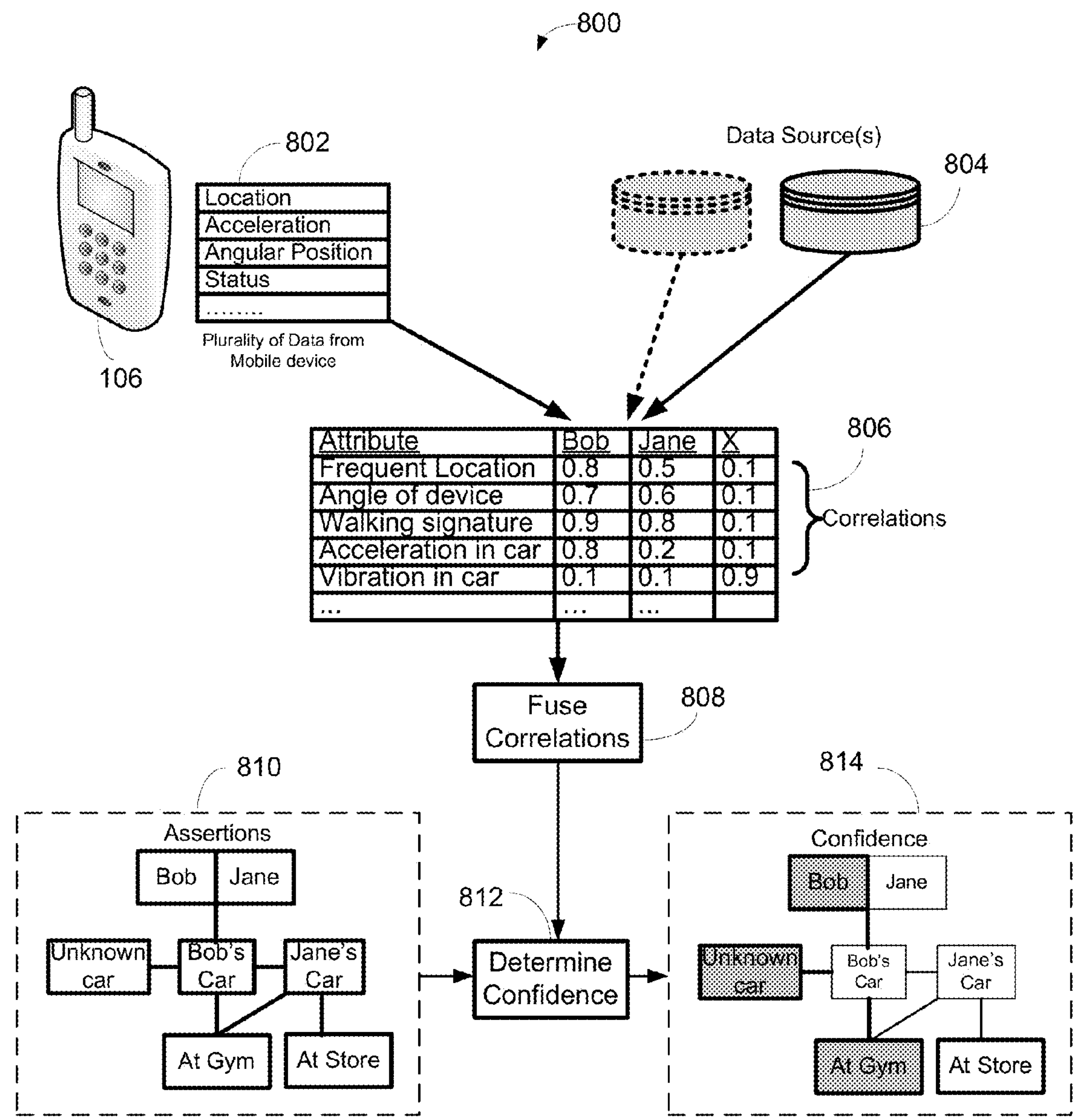
FIG. 8 is a block diagram of an illustrative entity scenario and assertion process 800, according to an example embodiment of the disclosed technology.

FIG. 8 is a block diagram of an example entity scenario and assertion process 800. According to an example embodiment of the disclosed technology, certain information 802 may be received from a mobile computing device 106. The information 802 may include classes comprising one or more of location, acceleration, angular position, status, time, sounds, etc. In accordance with an example embodiment, data from one or more data sources 804 (stored data for example, from a data repository) may be received and compared with the information 802 received from the mobile computing device 106. According to an example embodiment, correlations 806 between the classes of information 802 and data 804 may be determined for a plurality of vectors. For example, a first vector may correspond to "Bob"; a second vector may correspond to "Jane"; a third vector may correspond to a third entity "X" who may or may not be associated with Bob or Jane. Bob and Jane may represent a married couple, for example, who may share a vehicle, and may also share a mobile computing device 106. Example embodiments of the disclosed technology may provide a determination of who is most likely (Bob, Jane, or X) to be carrying the mobile device, and/or which vehicle they are utilizing at a given time.

In an example embodiment, information 802 may be gathered for Bob, Jane, and X, and stored as historical data 804 for such comparisons with new information 802. For example, correlations between the new information 802 and the historical data 804 may be made for each vector (Bob, Jane, and X). FIG. 8 depicts that the location data, the angle of the device, a walking signature, and an acceleration profile all likely correspond to the historical data 804 associated with the Bob vector. However, car vibration correlation indicates that it corresponds with a third car vector X. According to certain example embodiments, the correlations may be fused 808 to determine 812 a confidence 812 of a set of assertions 810. For example, one possible assertion 810 may be that Jane is driving Jane's car to the store. Another assertion 810 may be that Bob is driving Jane's care to the gym, and so forth. However, the correlation 806 obtained from the comparison of the vector information 802 from the mobile computing device 106 and the data 804 obtained from the data sources indicate that the assertion 810 combination with the highest confidence 814 is that Bob is driving an unknown car (X) to the gym. Example embodiments of the disclosed technology may include more or less vectors, and confidence levels of certain assertions may be based on more or less data or information classes than are presented in the example shown in FIG. 8.

Figure 9:
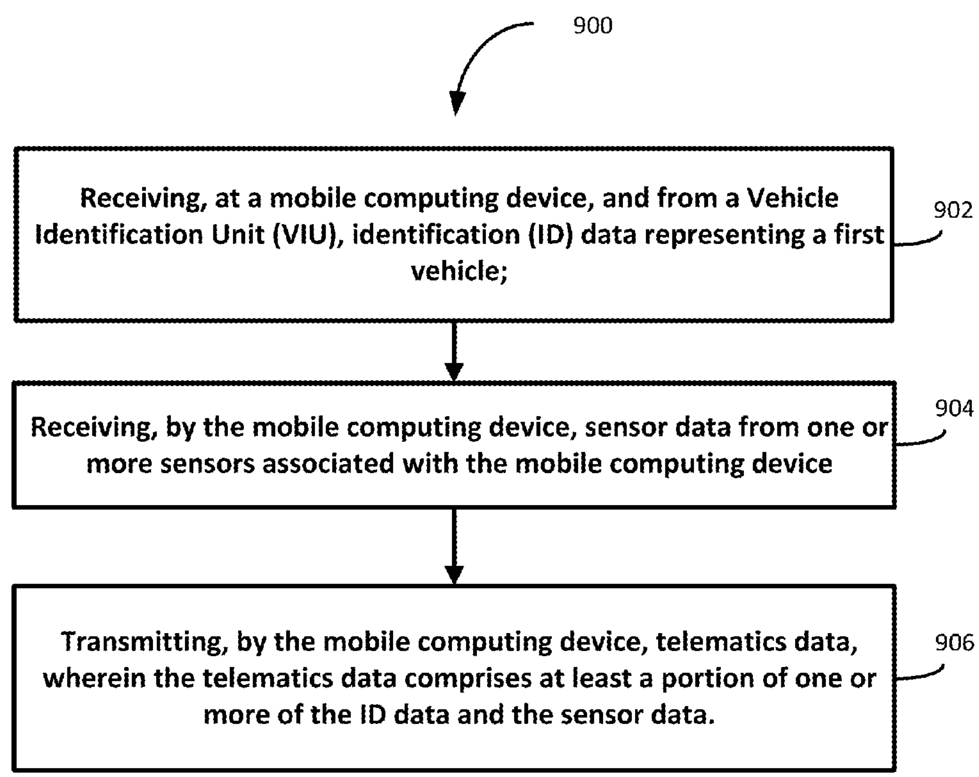
FIG. 9 is a flow diagram of another method according to an example embodiment of the disclosed technology.

An example method 900 will now be described with reference to the flowchart of FIG. 9. The method 900 starts in block 902, and according to an example embodiment of the disclosed technology includes receiving, at a mobile computing device, and from a Vehicle Identification Unit (VIU), identification (ID) data representing a first vehicle. In block 904, the method 900 includes receiving, by the mobile computing device, sensor data from one or more sensors associated with the mobile computing device. In block 906, the method 900 includes transmitting, by the mobile computing device, telematics data, wherein the telematics data comprises at least a portion of one or more of the ID data and the sensor data.

According to certain example embodiments, the method may further include receiving, at an Operational Measurement Unit (OMU), an operation indication associated with the first vehicle, wherein the OMU includes an operational measurement component configured to advance an operational count in response to receiving the operation indication. Certain example embodiments may include transmitting data representing the operational count wirelessly to the mobile computing device, receiving, at the mobile computing device, the transmitted operational count data, and transmitting, by the mobile computing device, the telematics data, wherein the telematics data further includes the operational count data.

In certain example embodiments, the operation indication may be sensed by the OMU when the first vehicle is in an operating state. Certain example embodiments may include wirelessly transmitting data representing the operational count to the mobile computing device based at least in part on the sensed operation indication. In certain example embodiments the mobile computing device may be configured to receive the sensor data based at least in part on the operation indication received by the OMU.

According to certain example embodiments, the method may further include wirelessly transmitting, to the mobile computing device from a Vehicle Data Unit (VDU), vehicular information corresponding to the first vehicle; receiving, at the mobile computing device, the vehicular information; and transmitting, by the mobile computing device, telematics data, wherein the telematics data further comprises the vehicular information. According to na example implementation of the disclosed technology, the method may further include transmitting the ID data representing the first vehicle from a Vehicle Data Unit (VDU) to the VIU.

According to an example implementation of the disclosed technology, an embodiment may include wirelessly transmitting to the mobile computing device from a Vehicle Data Unit (VDU), vehicular information corresponding to the first vehicle, receiving, at the mobile computing device, the vehicular information; and transmitting, by the mobile computing device to a remote server, telematics data, wherein the telematics data may further include the vehicular information.

In an example embodiment, a method may include determining, based at least in part on the received telematics data, one or more entity scenarios comprising identifying one or more of an individual in possession of or associated with the mobile computing device, characteristics of an individual in possession of or associated with the mobile computing device, and a vehicle in proximity to the mobile device and associated with the VIU.

In an example embodiment, the sensor data comprises accelerometer data, magnetometer data, gyroscope data, clock data, global positioning system (GPS) data, Bluetooth system data comprising one or more of paring or disconnects, microphone signals, and Wi-Fi system data. In an example embodiment, the telematics data further comprises one or more of repeat location visits, repeatable events, velocity, acceleration, location at a specific time, body patterns, habits, data attributes indicative of education level, data attributes indicative of age, data attributes indicative of gender, data attributes indicative of behavior risks, or groups of events.

Example embodiments may further include comparing a first time count with a second time count, wherein the first time count corresponds to a previously stored power-down time count, and wherein the second time count corresponds to a power-up time count; and providing an alert when the first time count and second time count differ by greater than a predefined threshold, wherein providing the alert comprises one or more of transmitting by the mobile computing device a notification to the remote server, and generating a message for output by the mobile computing device.

Example embodiments may further include receiving and storing, at the server, the transmitted telematics data associated with the first vehicle; receiving and storing, at the remote server, telematics data associated with a plurality of vehicles; and comparing at least a portion of the received telematics data from the first vehicle with telematics data from the plurality of vehicles to determine one or more risk factors associated with operating the first vehicle.

Example embodiments may further include receiving and storing, at the remote server, the transmitted telematics data associated with the first vehicle; and outputting at least a portion of the telematics data in graphical format. An example embodiment may include determining, based at least in part on the received telematics data, one or more entity scenarios comprising one or more assertions; comparing one or more attributes of the received telematics data with information from one or more data sources to determine a plurality of correlations; calculating a confidence level associated with the one or more assertions based at least in part on the determined plurality of correlations; and outputting a score representative of the confidence level that the received telematics data comprises one or more attributes that correspond to the one or more assertions.

Example embodiments may further include transforming the received telematics data, wherein the transforming comprises one or more of formatting, filtering, compressing, or validating the received telematics data. In an example embodiment the information from one or more data sources comprises previously stored information having a class type corresponding to the received telematics data, wherein the class type comprises accelerometer data, magnetometer data, gyroscope data, clock data, global positioning system (GPS) data, Bluetooth system data comprising one or more of paring or disconnects, microphone signals, or Wi-Fi system data.

In an example embodiment, determining the one or more entity scenarios comprising one or more assertions comprises identifying one or more of an individual in possession of or associated with the mobile computing device, characteristics of an individual in possession of or associated with the mobile computing device, and a vehicle in proximity to the mobile device.

In an example embodiment, comparing one or more attributes of the received data with information from one or more data sources comprises comparing one or more of repeat location visits, repeatable events, velocity, acceleration, location at a specific time, body patterns, habits, data attributes indicative of education level, data attributes indicative of age, data attributes indicative of gender, data attributes indicative of behavior risks, or groups of events.

In accordance with an example embodiment, certain requirements may be met, for example, in order to capture and monitor appropriate telematic data. For example, in one embodiment, the GPS sensor may be required to be active in the mobile device 106 for participation. GPS data, for example, may be used to determine speed, acceleration, deceleration/braking, and distance traveled. According to an example implementation, GPS data may be collected on a second by second basis. According to an example implementation, an accelerometer or magnetometer associated with the mobile device 106 may be used to collect data, for example, at a frequency of about every 1/10 second, or approximately 10 Hz.

In accordance with certain example embodiments, analytics may be generated based on a population of drivers, and certain irregularities in the data from individual drivers may be detected and characterized, filtered, etc. For example, the analytics may be utilized to detect "tampering" events or situations where the GPS sensor was disabled. Such information may be scored and provided to any number of entities, for example, to alert them to a possible high-risk driver.

According to certain example embodiments, the mobile application installed and running on the driver's mobile device 106 may be targeted such that battery usage is <5% of the overall expected battery life when the device is in stand-by mode, and <20% of the overall expected battery life when the device is in active mode. In an example implementation, the mobile application may be targeted so monthly data usage is <5 MB when connected to cellular plan.

According to example embodiments of the disclosed technology, several attributes that may be derived from the monitoring the vehicle telematics, according to example embodiments of the disclosed technology. For example, the vehicle VIN may be derived from the VIU 103, but the number of accelerations above a certain threshold may be derived by the sensors associated with the smartphone 106 via a mobile application. According to certain example embodiments of the disclosed technology, engine operational time counts may be derived from the OMU 107. In certain example embodiments, vehicular data presented at a port 110 associated with a vehicle 102 may be received and transmitted to the smartphone 106 by the VDU 105. In certain example embodiments, other analytics and attributes may be further refined or derived at the remote server.

Certain details for obtaining the telematic data in a may be carried out in accordance with an example embodiment of the disclosed technology. For example, the mobile application may require the user to manually pair the mobile device with one or more peripheral devices, for example, as new Bluetooth connection. In one example embodiment, pairing may be initiated at the original setup and may automatically reconnect with the peripheral device each time the vehicle is started, marking the beginning of a trip. If the Bluetooth (or other wireless) connection is lost, then the application may automatically try to re-establish the connection with the mobile device. The application may recognize the start of a trip as when the peripheral device connects with the mobile device via the established wireless connection because there may be data being transmitted by the peripheral device. The application may recognize the end of a trip when the connection with the one or more peripheral devices and the mobile device is terminated by the established wireless connection because there may no longer be any data being transmitted from the one or more peripheral devices. In certain example embodiments, the application may automatically restart if the mobile device is restarted, as long as the application was running prior to the device restart.

According to an example embodiment, the participant (i.e., applicant, insured, drive, etc.) may be required to start the mobile application initially on the mobile device after installation. The mobile application may rely on the GPS sensor to collect data on a second by second basis to derive speed, acceleration, deceleration and distance. If the GPS sensor is not on when the peripheral device is initiated, the mobile application may turn it on and may prompt the participant if necessary. If the GPS sensor is disabled or is dropped during a trip, the trip may be ended and the collected data may be transmitted. In one embodiment, the application may omit any prompt that the GPS sensor has been lost, but may instead, provide a prompt for restart of the sensor at the beginning of the next trip. The mobile application may not collect or transmit data if the application is stopped by the participant.

In an example implementation, a Telematics ID may be sent for the registered mobile communications device, via the participants chosen delivery method, so that pairing between the mobile device and the one or more peripheral devices can be established. In one embodiment, the mobile application may require the user to login to the mobile device at initial setup/pairing of the device with the Telematics ID (which may be systematically generated and supplied via text message) after the user has completed the registration process on a web site, for example.

According to certain example implementation of the disclosed technology there may not be any required participant interaction if all of the following are true: (1) the mobile application is correctly installed on the mobile device (if the application is not correctly installed, the participant should re-install the application); (2) the mobile application is started on the mobile device (if the application is not started, the participant should restart the application on the device); (3) the application has been successfully registered with a unique Telematics ID (if the application is not correctly registered, the participant should re-register the device and/or contact Customer Support); (4) the device is paired to the one or more peripheral devices, such as the VIU 103 (if the device is not correctly paired, the participant should reestablish the wireless connection); (5) the mobile device is within the cellular provider's signal area for data transmission (if the device is not in the cellular provider's signal area, the transmission may need to wait for the participant to reenter the provider's area).

According to an example embodiment, one or more of the following participant information may be gathered, and may be included in the web page or report made available to an authorized participant and/or the insurance carrier: Participant First Name; Participant Last Name; Carrier Name; Policy Number; Date of Birth; Driver's License Number; VIN; Mobile Phone #; Telematics ID; Email Address; Street Address; City; State; and Zip.

In accordance with an example embodiment, the following information may be included in the web page or report made available to the participant and/or authorized entity. Vehicle Make; Vehicle Model; Vehicle Year; Date and time of last successful data sync; and trip-level statistics. Tables 2-7 below summarize example data that may be collected and archived and/or included in the web page or report made available to an authorized participant or authorized entity.

TABLE 2

| Trip level statistics | | | | | |
|---|---|---|---|---|---|
| Start Time | End Time | Distance (miles) | Average Speed | Max Speed | Duration (hh:mm) |
| 10:15 a | 10:47 a | 15 m | 33 mph | 55 mph | 00:32 |
| 3:31 p | 4:35 p | 39 m | 48 mph | 62 mph | 01:04 |

TABLE 3

| Monthly summary | | | | | | |
|---|---|---|---|---|---|---|
| Month | Total Trips | Total Distance (miles) | Average Distance per Day | Average Distance per Trip | Total Driving Time | Driving Time per Day |
| January | 63 | 1246 m | 40.2 m | 19.8 m | 84:26 | 01:55 |
| February | 52 | 1186 m | 42.5 m | 22.8 m | 78:31 | 00:52 |

TABLE 4

| Day of week statistics | | | | | |
|---|---|---|---|---|---|
| Day of Week | Total Trips | Total Distance (miles) | Average Distance per Trip | Total Driving Time | Driving Time per Day |
| Monday | 3 | 64.8 m | 21.3 m | 3:21 | 1:07 |
| Tuesday | 7 | 174.3 m | 24.9 m | 8:31 | 1:18 |

TABLE 5

| Time of day statistics | | | | | |
|---|---|---|---|---|---|
| Time of Day | Total Trips | Total Distance (miles) | Average Distance per Trip | Total Driving Time | Driving Time per Bracket |
| 8:00 a-9:00 a | 3 | 64.8 m | 21.3 m | 3:21 | 1:07 |
| 9:00 a-10:00 a | 2 | 28.4 m | 14.2 m | 1:50 | 00:55 |
| 10:00 a-11:00-a | 7 | 174.3 m | 24.9 m | 8:31 | 1:18 |

TABLE 6

| Monthly driving events | | | | |
|---|---|---|---|---|
| Month | # of Hard Brakes | # of Hard Accelerations | Average Speed | Max Speed |
| January | 14 | 36 | 40.2 m | 68.3 m |
| February | 19 | 31 | 42.5 m | 67.8 m |

TABLE 7

| Driving periods without monitoring | | |
|---|---|---|
| Date and time of Previously matched Hobbs meter count and mirrored count | Unmonitored duration | Unmonitored Miles Driven |
| 1/4/2012 08:20 am | 38 hours | 40.2 miles |
| 2/8/2013 05:32 pm | 88 hours | 165.4 miles |

One of skill in the art will recognize that the above examples are presented only for illustrative purposes. Other information can be included, substituted, or combined in various embodiments of the system 100, system 300, and/or the system 700.

As discussed above in detail, embodiments of the monitoring system disclosed herein may provide an effective means of determining an insurance risk for a vehicle insurance applicant. By monitoring a mobile communication device of the driver, the monitoring system can monitor driving to determine certain driving risks, thereby establishing an insurance premium that accurately reflects the insurance risk involved.

According to example implementations, certain technical effects can be provided, such as creating certain systems and methods that provide real driving data for assessing risks associated with an insurance applicant. Example implementations of the disclosed technology can provide the further technical effects of providing systems and methods for obtaining driving analytics for a plurality of drivers for use in establishing risks associated with certain driving behaviors.

In example implementations of the disclosed technology, the telematics monitoring system 100 may include any number of hardware and/or software applications that are executed to facilitate any of the operations. In example implementations, one or more I/O interfaces may facilitate communication between the telematics monitoring system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the telematics monitoring system 100. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the telematics monitoring system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Example embodiments include storing at least a portion of the received plurality of data in a centralized data repository. According to an example embodiment, the storing further includes transforming the received data, wherein the transforming may include one or more of formatting, filtering, compressing, or validating the received data.

According to example embodiments, information from one or more data sources includes previously stored information having a class type corresponding to the received plurality of data, wherein the class types are: accelerometer data, magnetometer data, gyroscope data, clock data, global positioning system (GPS) data, Bluetooth system data that can include one or more of paring or disconnects, microphone signals, or Wi-Fi system data.

According to an example embodiment, receiving the plurality of data from the mobile device includes receiving data from one or more of a cellular phone, a tablet computer, a handheld mobile computing device, or a wearable mobile device. In certain example embodiments, determining one or more entity scenarios include one or more assertions identifying one or more of an individual in possession of or associated with the mobile device, characteristics of an individual in possession of or associated with the mobile device, or one or more vehicles in proximity to the mobile device. In certain example embodiments, comparing one or more attributes of the received data with information from one or more data sources includes comparing one or more of repeat location visits, repeatable events, velocity, acceleration, location at a specific time, body patterns, habits, data attributes indicative of education level, data attributes indicative of age, data attributes indicative of gender, data attributes indicative of behavior risks, or groups of events. According to example embodiments, the comparing includes one or more of a correlation, a convolution, frequency analysis, a matching, a transformation, vector analysis, or multivariate analysis.

According to example embodiments, certain technical effects can be provided, such as creating certain systems and methods that enable identifying one or more of an individual in possession of or associated with the mobile device, characteristics of an individual in possession of or associated with the mobile device, or one or more vehicles in proximity to the mobile device. Example embodiments of the disclosed technology can provide the further technical effects of providing systems and methods for comparing one or more of repeat location visits, repeatable events, velocity, acceleration, location at a specific time, body patterns, habits, data attributes indicative of education level, data attributes indicative of age, data attributes indicative of gender, data attributes indicative of behavior risks, or groups of events to determine a confidence of an assertion.

In example embodiments of the disclosed technology, the analysis system 200 may include any number of hardware and/or software applications that are executed to facilitate any of the operations. In example embodiments, one or more I/O interfaces may facilitate communication between the analysis system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the analysis system 200. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the analysis system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, embodiments of the disclosed technology may include a telematics system 100, 200, 300, 700 with more or less of the components illustrated in FIGS. 1-3 and/or FIGS. 6-8.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain embodiments of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:

receiving, at a processor, an operation indication associated with operation of a vehicle, wherein the operation indication comprises power being supplied to an on-board diagnostics (OBD) port associated with the vehicle;

responsive to receiving the operation indication, advancing an operational count of a vehicle power activated counter;

storing the operational count;

comparing the stored operational count with a previously stored count, wherein the previously stored count corresponds to a previously stored end-of-vehicle-operation operational count, and wherein the stored operational count corresponds to a start-of-vehicle-operation operational count, wherein the processor is further configured to provide an alert in response to the stored operational count and the previously stored count differing by greater than a predefined threshold; and generating, responsive to the comparing, a monitor indication representing whether the vehicle has been monitored during a previous operation.

2. The method of claim 1, further comprising receiving vehicular identification data related to the vehicle, wherein the vehicular identification data comprises identification (ID) data representing the vehicle.

3. The method of claim 1, further comprising:

receiving and storing, at a server, telematics data associated with the vehicle;

comparing at least a portion of the received telematics data with telematics data associated with a plurality of other vehicles to determine one or more risk factors associated with operating the vehicle.

4. The method of claim 1, further comprising receiving and storing telematics data associated with the vehicle; and outputting at least a portion of the telematics data in graphical format.

5. The method of claim 4, further comprising transforming the telematics data, wherein the transforming comprises one or more of formatting, filtering, compressing, or validating the received telematics data.

6. The method of claim 1, further comprising:

determining one or more entity scenarios comprising one or more assertions;

comparing one or more attributes of telematics data with information from one or more data sources to determine a plurality of correlations;

calculating a confidence level associated with the one or more assertions based at least in part on the determined plurality of correlations; and outputting a score representative of the confidence level that the telematics data comprises one or more attributes that correspond to the one or more assertions.

7. The method of claim 6, wherein the information from one or more data sources comprises previously stored information having a class type corresponding to the telematics data, wherein the class type comprises accelerometer data, magnetometer data, gyroscope data, clock data, global positioning system (GPS) data, Bluetooth system data comprising one or more of paring or disconnects, microphone signals, or Wi-Fi system data.

8. The method of claim 6, wherein determining the one or more entity scenarios comprising one or more assertions comprises identifying one or more of an individual in possession of or associated with the mobile computing device, characteristics of an individual in possession of or associated with the mobile computing device, and a vehicle in proximity to the mobile device and associated with identification (ID) data representing the vehicle.

9. The method of claim 6, wherein the comparing one or more attributes of the telematics data with information from one or more data sources comprises comparing one or more of repeat location visits, repeatable events, velocity, acceleration, location at a specific operational, body patterns, habits, data attributes indicative of education level, data attributes indicative of age, data attributes indicative of gender, data attributes indicative of behavior risks, or groups of events.

10. A computer-implemented method comprising:

receiving, at a mobile computing device, an operation indication associated with operation of a vehicle, wherein the operation indication is received responsive to power being supplied to an on-board diagnostics (OBD) port associated with the vehicle, and wherein the operation indication advances an operational count of a vehicle power activated counter each time the vehicle is operated;

responsive to receiving the operation indication:

storing, in a memory associated with the mobile computing device, the operational count;

comparing the stored operational count with a previously stored count, wherein the previously stored count corresponds to a previously stored end-of-vehicle-operation operational count, and wherein the stored operational count corresponds to a start-of-vehicle-operation operational count, wherein the processor is further configured to provide an alert in response to the stored operational count and the previously stored count differing by greater than a predefined threshold;

generating, by the mobile computing device, and responsive to the comparing, a monitor indication representing whether the vehicle has been monitored during a previous operation; and transmitting telematics data, wherein the telematics data comprises at least a portion of one or more of the operational count and the monitor indication.

11. The method of claim 10, further comprising receiving vehicular identification data related to the vehicle, wherein the vehicular identification data comprises identification (ID) data representing the vehicle, and wherein the telematics data further comprises the ID data.

12. The method of claim 10, further comprising:

receiving, by the mobile computing device, sensor data from one or more sensors associated with the mobile computing device; and transmitting, by the mobile computing device, telematics data, wherein the telematics data comprises at least a portion of the sensor data.

13. The method of claim 10, further comprising:

determining, based at least in part on the telematics data, one or more entity scenarios comprising identifying one or more of an individual in possession of or associated with the mobile computing device, characteristics of an individual in possession of or associated with the mobile computing device, and a vehicle in proximity to the mobile computing device.

14. The method of claim 10, wherein the telematics data further comprises accelerometer data, magnetometer data, gyroscope data, clock data, global positioning system (GPS) data, Bluetooth system data comprising one or more of paring or disconnects, microphone signals, and Wi-Fi system data.

15. The method of claim 10, wherein the telematics data further comprises one or more of repeat location visits, repeatable events, velocity, acceleration, location at a specific operational, body patterns, habits, data attributes indicative of education level, data attributes indicative of age, data attributes indicative of gender, data attributes indicative of behavior risks, and groups of events.

16. A system comprising:

at least one memory for storing data and computer-executable instructions; and at least one processor configured to access the at least one memory and further configured to execute the computer-executable instructions to:

receive an operation indication associated with operation of a vehicle, wherein the operation indication comprises power being supplied to an on-board diagnostics (OBD) port associated with the vehicle;

advance an operational count of a vehicle power activated counter responsive to the operation indication;

store, in the memory, the operational count;

compare the stored operational count with a previously stored count, wherein the previously stored count corresponds to a previously stored end-of-vehicle-operation operational count, and wherein the stored operational count corresponds to a start-of-vehicle-operation operational count, wherein the at least one processor is further configured to provide an alert in response to the stored operational count and the previously stored count differing by greater than a predefined threshold;

generate, responsive to the comparing, a monitor indication representing whether the vehicle has been monitored during a previous operation; and transmit telematics data, wherein the telematics data comprises at least a portion of one or more of the operational count and the monitor indication.

17. The system of claim 16, further comprising one or more sensors in communication with the at least one processor, and wherein the at least one processor is further configured to receive sensor date from the one or more sensors; and wherein the telematics data further comprises at least a portion of the sensor data.

18. The system of claim 17, wherein the sensor data comprises accelerometer data, magnetometer data, gyroscope data, clock data, global positioning system (GPS) data, Bluetooth system data comprising one or more of paring or disconnects, microphone signals, and Wi-Fi system data.

19. The system of claim 16, wherein the at least one processor is further configured to receive vehicle identification (ID) data, and wherein the telematics data further comprises at least a portion of the ID data.

20. The system of claim 16, wherein the telematics data further comprises one or more of repeat location visits, repeatable events, velocity, acceleration, location at a specific operational, body patterns, habits, data attributes indicative of education level, data attributes indicative of age, data attributes indicative of gender, data attributes indicative of behavior risks, or groups of events.

21. A non-transitory computer-readable media that stores instructions that, when executed, cause one or more processors to perform a method comprising:

receiving, at a mobile computing device, an operation indication associated with operation of a vehicle, wherein the operation indication is received responsive to power being supplied to an on-board diagnostics (OBD) port associated with the vehicle, and wherein the operation indication advances an operational count of a vehicle power activated counter each time the vehicle is operated;

responsive to receiving the operation indication:

storing, in a memory associated with the mobile computing device, the operational count;

comparing the stored operational count with a previously stored count, wherein the previously stored count corresponds to a previously stored end-of-vehicle-operation operational count, and wherein the stored operational count corresponds to a start-of-vehicle-operation operational count, wherein the processor is further configured to provide an alert in response to the stored operational count and the previously stored count differing by greater than a predefined threshold;

generating, by the mobile computing device, and responsive to the comparing, a monitor indication representing whether the vehicle has been monitored during a previous operation; and transmitting telematics data, wherein the telematics data comprises at least a portion of one or more of the operational count and the monitor indication.

22. The non-transitory computer-readable media of claim 21 that further stores instructions that, when executed, cause one or more processors to:

receive vehicular identification data related to the vehicle, wherein the vehicular identification data comprises identification (ID) data representing the vehicle, and wherein the telematics data further comprises the ID data.

23. The non-transitory computer-readable media of claim 21 that further stores instructions that, when executed, cause one or more processors to:

receive, by the mobile computing device, sensor data from one or more sensors associated with the mobile computing device; and transmit, by the mobile computing device, telematics data, wherein the telematics data comprises at least a portion of the sensor data.

24. The non-transitory computer-readable media of claim 21, wherein the telematics data further comprises accelerometer data, magnetometer data, gyroscope data, clock data, global positioning system (GPS) data, Bluetooth system data comprising one or more of paring or disconnects, microphone signals, and Wi-Fi system data.

* * * * *